(12) United States Patent
Arifuku

(10) Patent No.: US 10,666,816 B2
(45) Date of Patent: May 26, 2020

(54) IMAGE TRANSMISSION APPARATUS, IMAGE DATA TRANSMISSION PROGRAM, AND IMAGE DATA TRANSMISSION SYSTEM

(71) Applicant: SHARP KABUSHIKI KAISHA, Sakai, Osaka (JP)

(72) Inventor: Naoya Arifuku, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/155,590

(22) Filed: Oct. 9, 2018

(65) Prior Publication Data

US 2019/0109953 A1    Apr. 11, 2019

(30) Foreign Application Priority Data

Oct. 10, 2017    (JP) ................. 2017-197053

(51) Int. Cl.
| | | |
|---|---|---|
| H04N 1/00 | (2006.01) | |
| G06Q 10/10 | (2012.01) | |
| H04L 12/58 | (2006.01) | |
| G06F 9/54 | (2006.01) | |
| G06F 16/955 | (2019.01) | |

(52) U.S. Cl.
CPC ......... *H04N 1/00212* (2013.01); *G06F 9/542* (2013.01); *G06F 16/9566* (2019.01); *G06Q 10/10* (2013.01); *G06Q 10/107* (2013.01); *H04L 51/18* (2013.01)

(58) Field of Classification Search
None
See application file for complete search history.

(56) References Cited

U.S. PATENT DOCUMENTS

| | | | | |
|---|---|---|---|---|
| 2007/0121155 A1* | 5/2007 | Machiyama | .......... | G06F 21/606 358/1.15 |
| 2009/0313340 A1* | 12/2009 | Ando | ................. | H04N 1/00212 709/206 |
| 2010/0306545 A1* | 12/2010 | Seki | ..................... | G06Q 10/107 713/175 |

FOREIGN PATENT DOCUMENTS

| | | |
|---|---|---|
| CN | 101783852 A | 7/2010 |
| JP | 2004-253871 A | 9/2004 |

* cited by examiner

*Primary Examiner* — Dov Popovici
(74) *Attorney, Agent, or Firm* — ScienBiziP, P.C.

(57) ABSTRACT

Image data that is read in an image reading scanner of an image transmission apparatus is retained in a URL area of a memory. A CPU of the image transmission apparatus transmits a notification mail that has notification contents which includes at least place information indicating retention place and a deletion function of being able of deleting the image data that is retained, to a user terminal via a network. The image data in the retention place is deleted when a deletion instruction is transmitted from the user terminal using the deletion function.

5 Claims, 19 Drawing Sheets

FIG. 16

| NOTIFICATION DESTINATION | DELETION INSTRUCTION |
|---|---|
| yamada-1@aabbcc.co.jp | ○ |
| ymada-2@ddeeff.co.jp | ○ |
| ... | |
| | |

IMAGE TRANSMISSION APPARATUS, IMAGE DATA TRANSMISSION PROGRAM, AND IMAGE DATA TRANSMISSION SYSTEM

BACKGROUND

1. Field

The present disclosure relates to an image transmission apparatus, an image data transmission program, and an image data transmission system, and particularly, for example, to an image transmission apparatus, an image data transmission program, and an image data transmission system, which transmit image data that is read in an image reading apparatus, to any other information processing apparatus such as a user terminal.

2. Description of the Related Art

An example of the related art is disclosed in Japanese Unexamined Patent Application Publication No. 2004-253871 [H04N 1/00, G03G 21/00, G06F 12/00, . . . ]. In Japanese Unexamined Patent Application Publication No. 2004-253871 [H04N 1/00, G03G 21/00, G06F 12/00, . . . ], in an image formation apparatus, it is possible that a file server or the like that is a data transfer destination is specified with information such as a mail address, and after transfer, a data place or a retention duration, and the like can be automatically notified to the designated distribution destination, and further data, the retention duration for which expires, can be automatically deleted from the file server.

In Description of the Related Art, in a case where data is desired to be immediately deleted, there is a need to delete the data after access to a retention destination and in some aspects, it is somewhat difficult for a user who performs deletion to perform the deletion. Furthermore, in a case where the user who desires to acquire data after manually deleting the data gains access, not only is the data difficult to acquire, but what is deleted is also not known. Thus, time is consumed in checking what is deleted.

SUMMARY

It is desirable to provide an image transmission apparatus, an image data transmission program, and an image data transmission system, which are novel.

Furthermore, it is desirable to provide an image transmission apparatus, an image data transmission program, and an image data transmission system, which are capable of performing reliable reception and simple deletion.

According to an aspect of the present disclosure, there is provided an image transmission apparatus that includes an image reading unit and transmits image data that is read in the image reading unit to a user terminal via a network, the apparatus including: a retention unit that retains the image data in a retention place; a transmission unit that transmits a notification mail which has notification contents that include at least place information indicating the retention place and a deletion function of being able of deleting the image data in the retention place, to the user terminal; and a deletion unit that deletes the image data in the retention place when a deletion instruction is transmitted from the user terminal using the deletion function.

According to another aspect of the present disclosure, there is provided an image data transmission program that is executed in a computer of an image transmission apparatus that includes an image reading unit and transmits image data that is read in the image reading unit to a user terminal via a network, the program causing the apparatus to function as: a retention unit that retains the image data in a retention place; a transmission unit that transmits a notification mail which has notification contents that include at least place information indicating the retention place and a deletion function of being able of deleting the image data in the retention place, to the user terminal; and a deletion unit that deletes the image data in the retention place when a deletion instruction is transmitted from the user terminal using the deletion function.

According to still another aspect of the present disclosure, there is provided an image data transmission system that includes an image reading unit and transmits image data that is read in the image reading unit to a user terminal via a network, the system including: a retention unit that retains the image data in a retention place; a transmission unit that transmits a notification mail which has notification contents that include at least place information indicating the retention place and a deletion function of being able of deleting the image data in the retention place, to the user terminal; and a deletion unit that deletes the image data in the retention place when a deletion instruction is transmitted from the user terminal using the deletion function.

The above-described aspects, other aspects, features, and advantages of the present disclosure will further be clarified from the following embodiments described in detail with reference to the drawings.

BRIEF DESCRIPTION OF THE DRAWINGS

FIG. 16 is a diagram illustrating an example of a notification destination table that is created in a data storage area of a memory of an image formation apparatus in an image data distribution system according still another embodiment of the present disclosure;

DESCRIPTION OF THE EMBODIMENTS

First Embodiment

Figure 1:
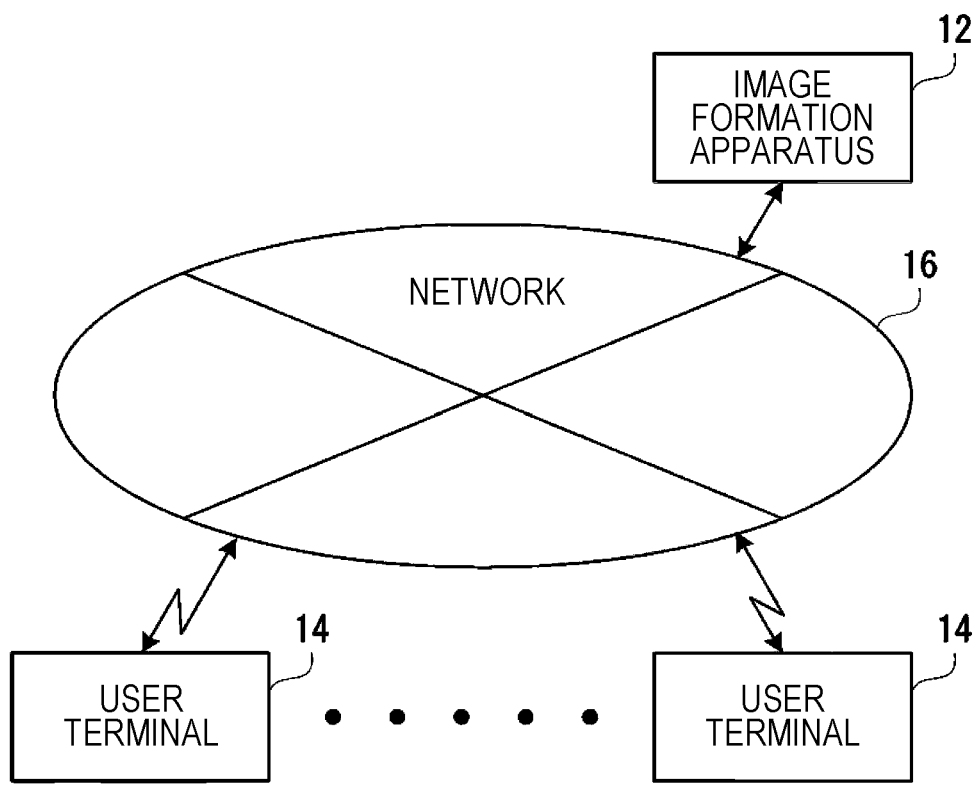
FIG. 1 is a block diagram illustrating an image data distribution system according to an embodiment of the present disclosure.

With reference to FIG. 1, an image data distribution (transmission) system 10 according to an embodiment of the present technology includes an image formation apparatus (equivalent to an image transmission apparatus 12), and a user terminal 14 is connected to the image formation apparatus 12 in an accessible manner via the Internet or a network 16 that functions the same function as the Internet. The user terminal 14 is a computer (a desktop computer, a notebook computer, a tablet computer, a smartphone, or the like) that has a communication function.

In this embodiment, the image formation apparatus 12 is a multi-function machine (a multi-function peripheral (MFP)) that has a copying function, a printer function, a scanner function, the communication function, and the like. However, the image formation apparatus 12 does not need to be limited to the multifunction machine. However, the image formation apparatus 12 has at least the scanning function, that is, an image reading function, and the communication function, and may be a color-type apparatus or may be a grayscale-type apparatus.

Figure 2:
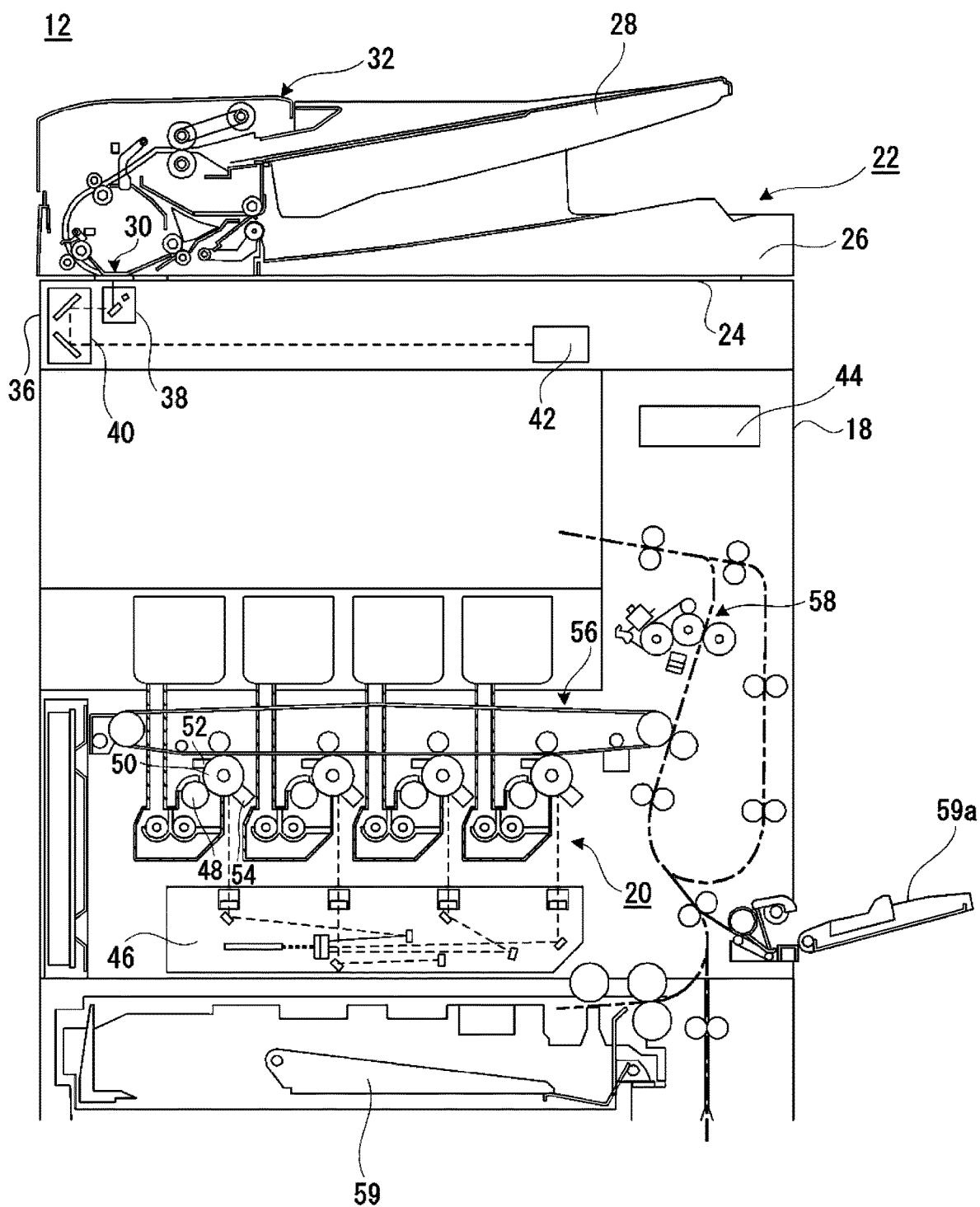
FIG. 2 is a diagram illustrating an example of the image formation apparatus according to the embodiment in FIG. 1.

First, a basic configuration of the image formation apparatus 12 is briefly described. As illustrated in FIG. 2, the image formation apparatus 12 includes an apparatus main-body 18 that includes an image formation unit 20 and the like, and an image reading apparatus 22 that is positioned on the top portion of the apparatus main-body 18.

The image reading apparatus 22 includes an original-document loading stand 24 that is formed of transparent material. An original-document pressing cover 26 is attached on the top portion of an original-document loading stand 24 in a manner that is opened and closed with a hinge or the like being involved. Provided on the original-document pressing cover 26 is an automatic document feeder (ADF) 32 that automatically feeds original documents (not illustrated) which are loaded within an original-document loading tray 28, one at a time, to an original-document reading position 30 in which an image reading glass pane is positioned. Furthermore, a touch display 34 (FIG. 3) on which a user applies an input operation and an operation unit that is configured with operations buttons and the like are provided on the front surface side of the original-document loading stand 24.

An original-document scanning unit 36 is provided on the image reading apparatus 22. The scanning unit 36, for example, includes a plurality of LEDs (not illustrated) that are arranged in a principal scanning direction (a directing that orthogonally intersects a paper sheet on which FIG. 2 is drawn. Provided on the scanning unit 36 are a light source unit 38 that is movable in a sub-scanning direction (a direction that runs in parallel to the paper sheet on which FIG. 2 is drawn), a mirror unit 40 that is movable in the sub-scanning direction at a moving speed that is half a moving speed of the light source unit 38, and an imaging unit 42 that includes an image formation lens, a line sensor, and the like.

In the scanning unit 36, a surface of the original document is exposed by the light source unit 38, and a reflection light that results from reflection from the surface of the original document is guided by the mirror unit 40 to the imaging lens (not illustrated) of the imaging unit 42. Then, the reflection light is image-formed by the image formation lens on a light receiving element of the line sensor (not illustrated). In the line sensor, the brightness or shade of the reflection light is detected that is image-formed on the light receiving element, and image data is generated that is based on an image on the surface of the original document. As the line sensor, a charge coupled device (CCD), a contact image sensor (CIS), or the like is used.

In this manner, the image data is output from the image reading apparatus 22, that is, the scanning unit 36. Therefore, the image reading apparatus 22, that is, the scanning unit 36 constitutes an image reading unit or an image data output unit.

Built into the apparatus main-body 18 are a control unit 44 that includes a CPU and the like, the above-described image formation unit 20, and the like. The control unit 44 transmits a control signal to each unit of the image formation apparatus 12 that includes a light exposure device (a light exposure unit) 46, according to the input operation to the operation unit such as the above-described the touch display 34, and causes the image formation apparatus 12 to perform various operations.

The image formation unit 20 includes the light exposure device 46, a developing unit 48, a photoreceptor drum 50, a photoreceptor cleaning unit 52, a charging unit 54, a transcription unit 56, a fixing unit 58, and the like. The image formation unit 20 forms an image on a paper sheet that is transported from a paper sheet feeding tray 59 or a hand-insertion paper sheet feeding tray 59, and discharges the paper sheet, image formation on which is competed, to a paper sheet discharging unit (not illustrated). As the image data for forming an image on the paper sheet, image data that is output from the image reading apparatus 22 (the scanning unit 36), image data that is transmitted from an external computer, and the like are used.

It is noted that image data which is handled in the image formation apparatus 12 according to the embodiment, which is a color-type apparatus, is one in accordance with an image of four colors, black (K), cyan (C), magenta (M), and yellow (Y). For this reason, the developing unit 48, the photoreceptor drum 50, the photoreceptor cleaning unit 52, and the charging unit 54 are provided in one set in such a manner as to form four types of electrostatic latent images in accordance with four colors, respectively. Thus, four image stations are configured.

It is noted that, in the image formation apparatus 12, not only is a configuration or operation of the image formation unit 20 known well, but the image formation unit 20 is also a constituent element that does not have a substantial relationship to the present technology, and thus descriptions of the configuration and the operation is not omitted.

Provided on the front surface side of the above-described original-document loading stand 24 is the operation unit that includes the touch display 34 (FIG. 3) on which the user applies input operations, such as a printing start instruction, the operations buttons, and the like.

Figure 3:
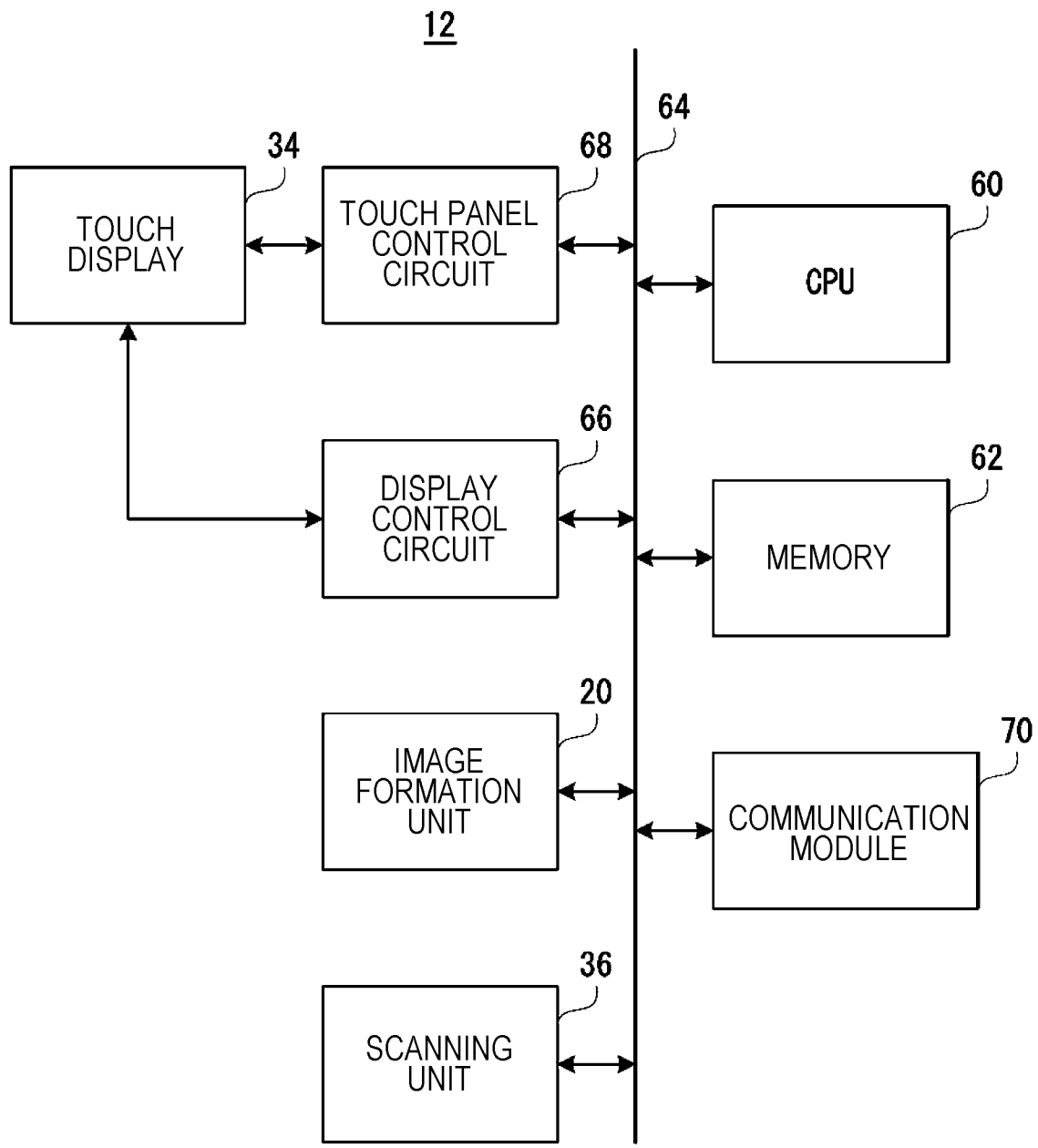
FIG. 3 is a block diagram illustrating an electrical configuration of the image formation apparatus that is illustrated in FIG. 2.

As described above, the control unit 44 that controls operation of each unit of the image formation apparatus 12 is provided in a predetermined position within the apparatus main-body 18. The control unit 44, as illustrated in FIG. 3, includes a CPU 60, a memory 62, and the like. The control unit 44 transmits the control signal to each unit of the image formation apparatus 12 according to operation input to the touch display 34 and the like, and causes the image formation apparatus 12 to perform various operations.

As illustrated in FIG. 3, the image formation apparatus 12 includes the CPU 60 that constitutes the control unit 44, and the CPU 60 is connected to the memory 62 via a bus 64. Examples of the memory 62 include a ROM, a RAM, and the like. A program for entire control of the image formation apparatus 12 or a program (will be described below) that is desired for the embodiment, which are executed by the CPU 60, is set in advance to be in the memory 62.

For the touch display 34 that constitutes the operation unit, a touch panel is provided to be integrally combined with a display, and a graphic user interface (GUI) is displayed on a display surface (a touch screen). The operation input can be input by touching on a designated portion of the GUI.

According to display data that is given by the CPU 60 through a display control circuit 66, displaying is performed on the touch display 34. A touch panel control circuit 68 supplies a voltage or the like that is desirable for the touch panel, and additionally, brings in touch coordinates indicating a position on the touch panel, which is touched by the user, and gives the touch coordinates to the CPU 60. Therefore, the CPU 60 can recognize on which position on the touch display 34 the operation (touch) input is present.

The CPU 60 is further connected by a communication module 70 to the network 16.

The image reading apparatus 22, as mentioned above, includes the scanning unit 36. The image data that is read in the scanning unit 36 is stored in the memory 62 under the control of the CPU 60. The image formation unit 20 forms a toner image on a recording paper sheet in an electrophotographic manner, according to image data that is given from the CPU 60 or image data that is given from, for example, a server or a computer.

Figure 4:
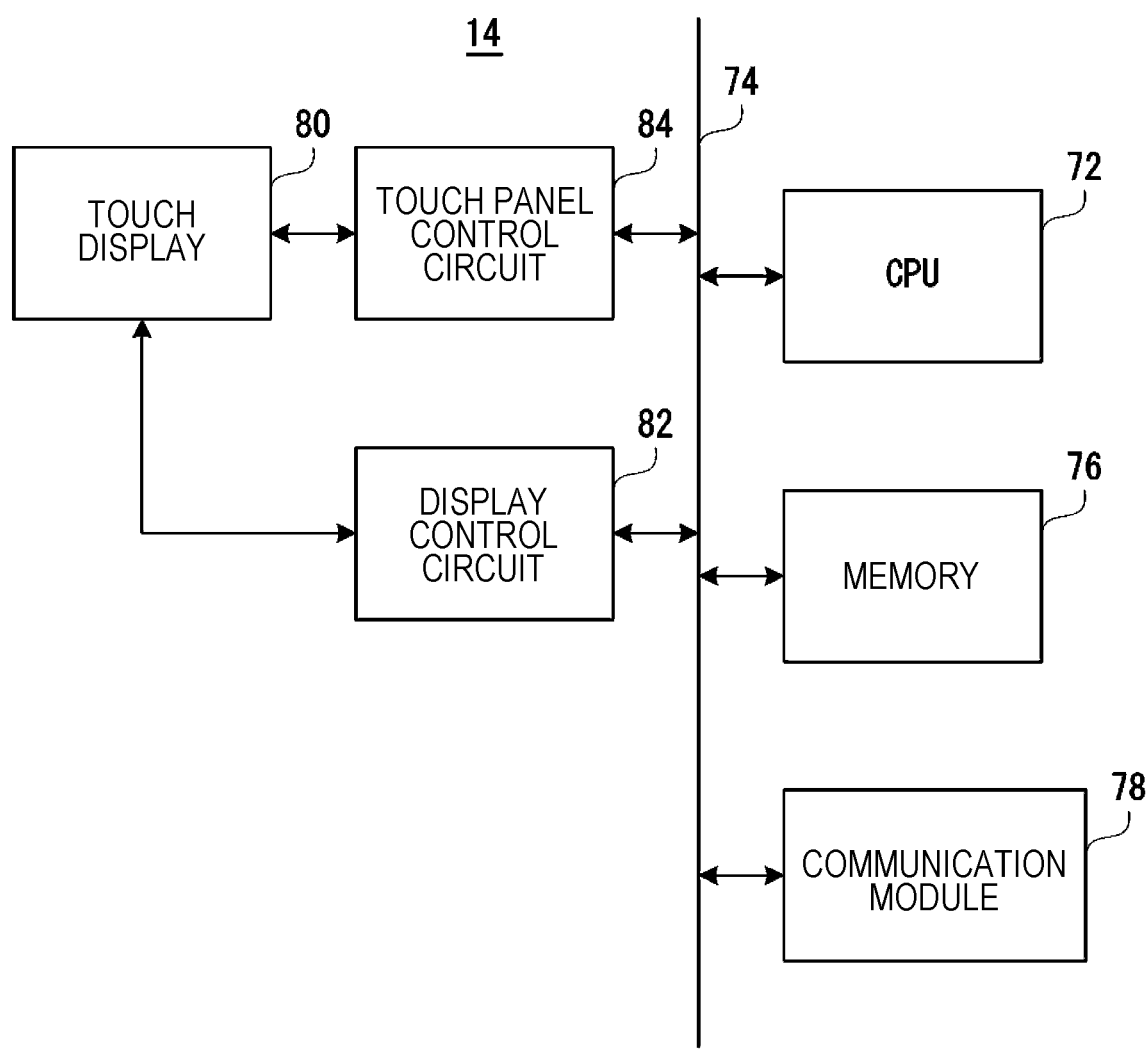
FIG. 4 is a block diagram illustrating an electrical configuration of a user terminal according to the embodiment in FIG. 1.

An example of the user terminal 14 according to the first embodiment is illustrated in FIG. 4, the user terminal 14 includes a CPU 72, and the CPU 72 is connected to a memory 76 via a bus 74. Examples of the memory 76 include a hard disk, a ROM, a RAM, and the like. A program for entire control of the user terminal 14, which is executed by the CPU 72, or a program (will be described below) that is desirable for the embodiment are set in advance to be in the memory 76.

The CPU 72 can further access the network 16, that is, the image formation apparatus 12 via the communication module 78.

For a touch display 80, a touch panel is provided to be integrally combined a display, and a GUI is displayed on a display surface (a touch screen). The operation input can be input by touching on the GUI.

According to display data that is given by the CPU 72 through a display control circuit 82, displaying is performed on the touch display 80. A touch panel control circuit 84 supplies a voltage or the like that is desirable for the touch panel, and additionally, brings in data coordinates indicating a position on the touch panel, which is touched on by the user, and gives the data coordinates to the CPU 72. Therefore, the CPU 72 can recognize on which position on the touch display 80 the operation (touch) input is present.

However, a display that does not have the touch panel may be used as a monitor of the user terminal 14. In such a case, the input operation can be performed by an input I/F such as a keyboard (not illustrated).

Figure 5:
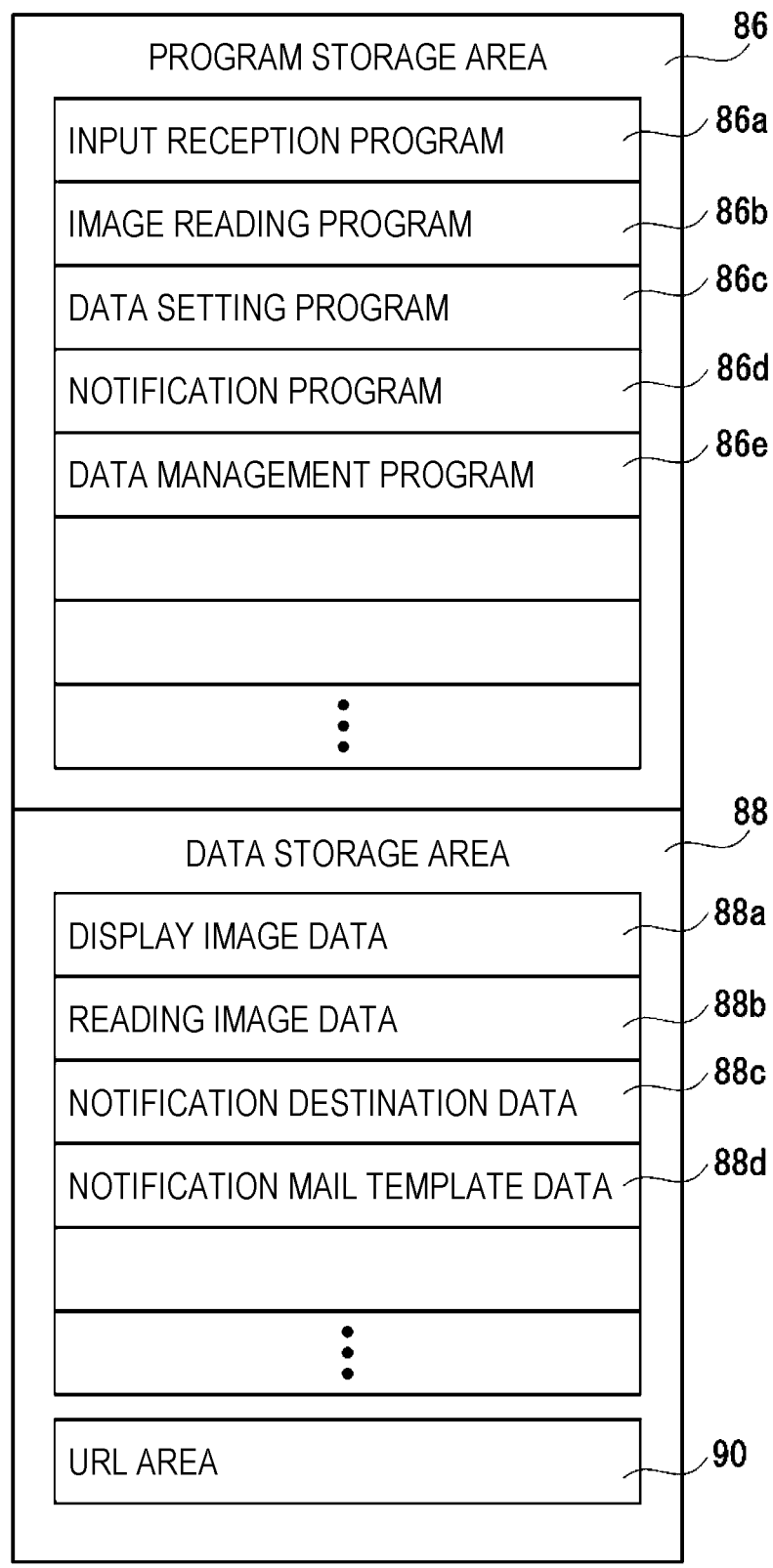
FIG. 5 is a diagram illustrating an example of a memory map of a memory of the image formation apparatus that is illustrated in FIG. 3.

A program storage area 86 and a data storage area 88, as illustrated in FIG. 5, are provided in the memory 62 of the image formation apparatus 12.

Included in the program storage area 86 are an input reception program 86a, an image reading program 86b, a data setting program 86c, a notification program 86d, a data management program 86e, and the like.

Figure 6:
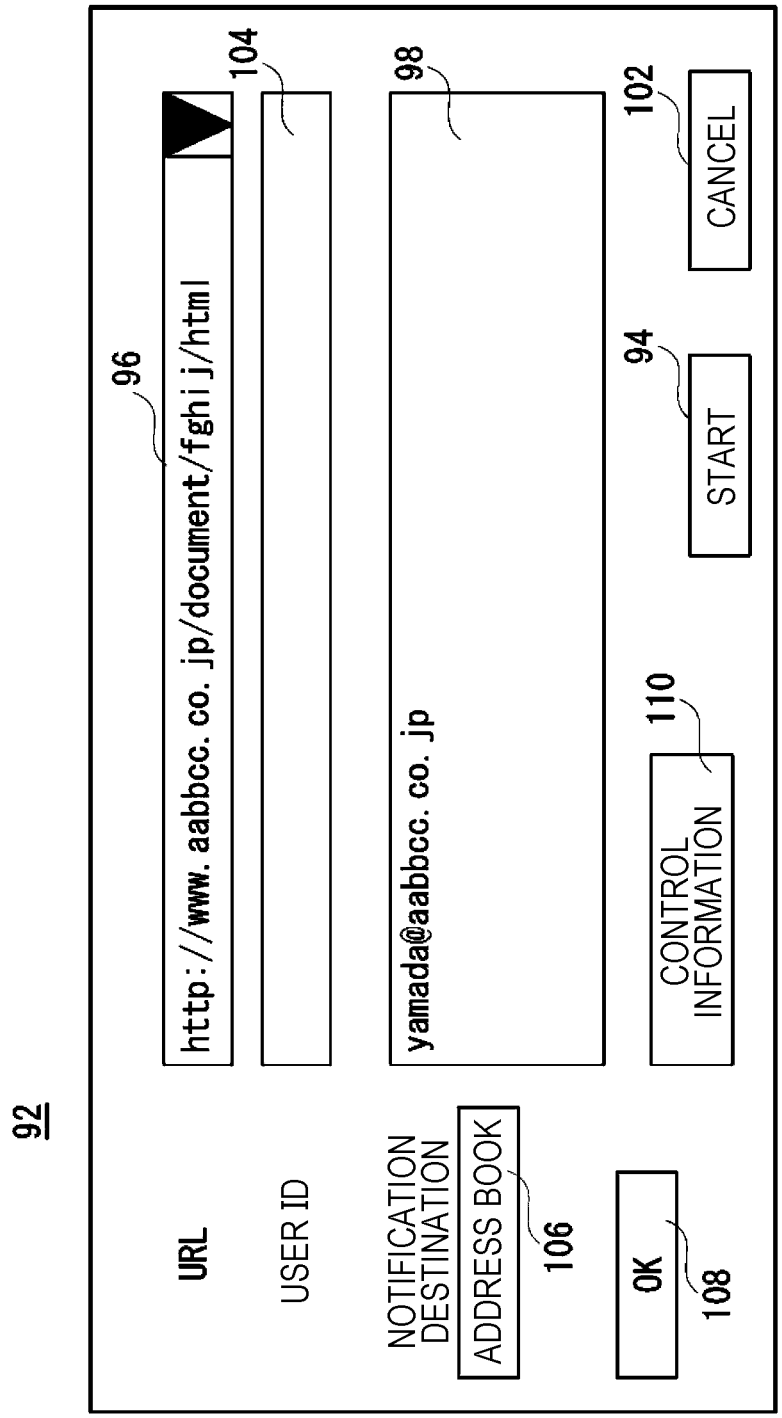
FIG. 6 is a diagram illustrating an example of a distribution setting GUI that is displayed on a touch display of the image formation apparatus that is illustrated in FIG. 3.

The input reception program 86a is a program for causing, for example, a distribution setting (transmission setting) GUI 92, as illustrated in FIG. 6, which is displayed according to data that is stored in a display image data area 88a which is set in advance in the data storage area 88, to be displayed to the touch display 34 (FIG. 3) and thus for receiving the operation input by the user.

The image reading program 86b is a program for causing the image reading apparatus 22, that is, the scanning unit 36 (FIGS. 2 and 3), to operate an image reading operation according to pieces of control information that are set in a distribution setting GUI 92, for example, pieces of control information, such as an original-document size, resolution, and a color or monochrome type, for example, when a start button 94 is operated in the distribution setting GUI 92 in FIG. 6.

The data setting program 86c is a program for retaining the image data, which is acquired as a result of the image reading operation that is performed according to the image reading program 86b, in a URL area 90 of the memory 62, which is indicated, for example, by a URL that is set to be in a URL setting area 96 of the distribution setting GUI 92 in FIG. 6. More precisely, the URL area 90 is an area for retaining the image data that is read by the image reading apparatus 22, that is, the scanning unit 36, according to the image reading program 86b.

Figure 7:
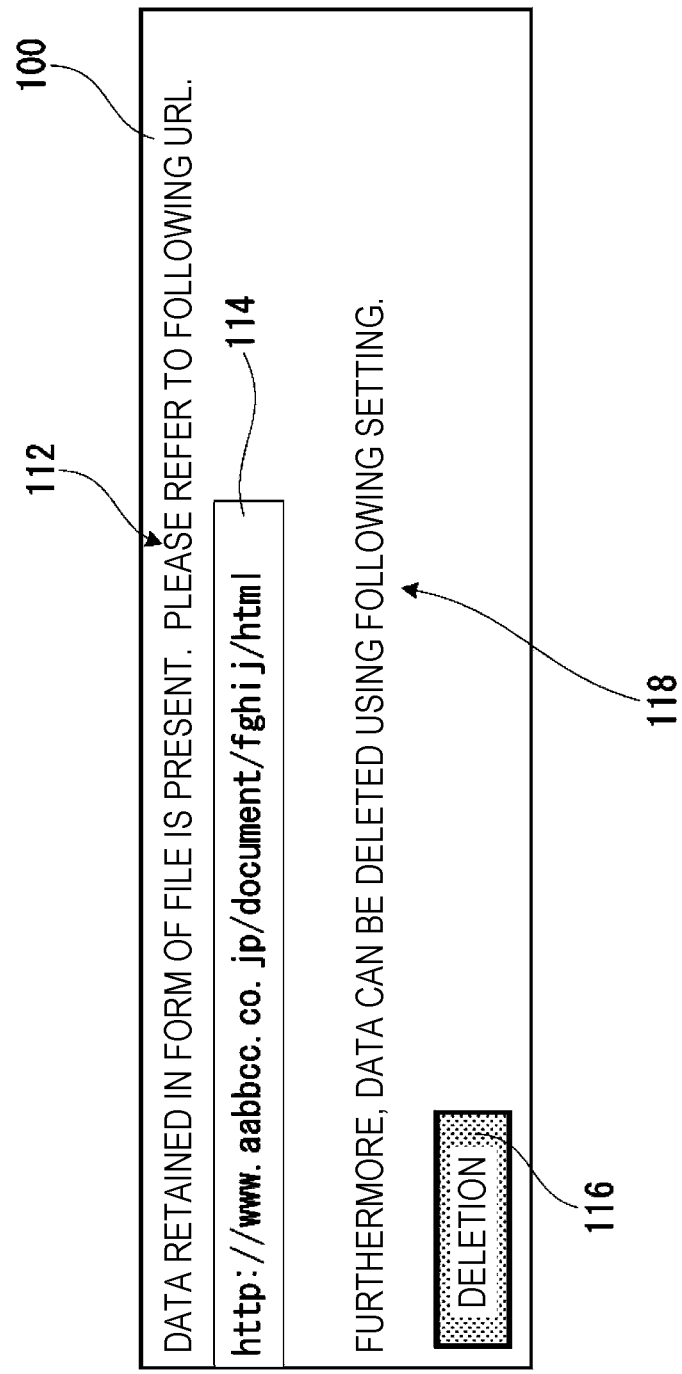
FIG. 7 is a diagram illustrating an example of a notification mail that is transmitted from the image formation apparatus to the user terminal.

The notification program 86d is a program for notifying a distribution destination of the image data that is set to be in the URL area 90 of the memory 62, and, for example, is a program for transmitting, for example, a notification mail 100, which is illustrated in FIG. 7, to a notification destination (a destination) that is set to be, for example, in a notification destination setting area 98 of the distribution setting GUI 92 in FIG. 6.

A data management program 86e is a program for managing the image data for distribution, which is set to be in the URL area 90, for example, managing whether or not deletion is performed, according to the data setting program 86c.

The display image data area 88a for storing display image data for displaying the above-described distribution setting GUI 92 or the like on the touch display 34 is set to be the data storage area 88 of the memory 62. The image data that is acquired as a result of the image reading operation which is performed according to the image reading program 86*b* is stored in a reading image data area 88*b*.

Figure 8:
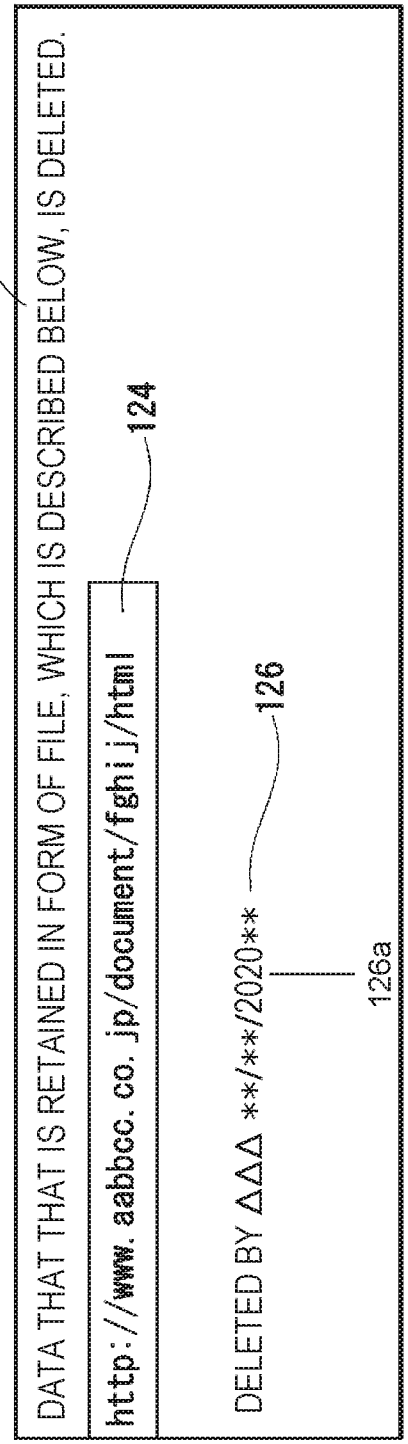
FIG. 8 is a diagram illustrating an example of a deletion notification mail that is transmitted from the user terminal when the image formation apparatus deletes data according to an instruction from the user terminal.

A notification destination data area 88*c*, a notification mail template data area 88*d*, and the like are further formed in the data storage area 88. The notification destination data area 88*c* is an area for storing, for example, data on a notification destination (a destination) that is set to be in the notification destination setting area 98 of the distribution setting GUI 92 in FIG. 6. The notification mail template data area 88*d* is an area for setting data, in advance, data on a template for the notification mail 100 as illustrated in FIG. 7, a deletion notification mail 120 as is illustrated in FIG. 8, or the like.

The URL area 90 is further provided, for example, in the data storage area 88 that is indicated with the URL which is set to be in the URL setting area 96 of the distribution setting GUI 92 in FIG. 6, in order to store the image data that is read according to the image reading program 86*b*.

It is noted that, without being set to be within the memory 62 of the image formation apparatus 12, the URL area 90 may be set to be in any recording medium (a storage area) in such a manner that the image formation apparatus 12 and the user terminal 14 possibly accesses the URL area 90.

However, if a server is assumed to be used as will be described below in a second embodiment, the URL area 90 needs to be a storage area that the server possibly accesses from the image formation apparatus 12 and the user terminal 14 in addition to the image formation apparatus 12 and the user terminal 14.

With reference to FIG. 6, the distribution setting GUI 92 is further described that is displayed on the touch display 34. The above-described the start button 94 is provided on the distribution setting GUI 92, and the start button 94 is operated to start an operation of distributing the image data. Separately from the start button 94, a cancel button 102 is provided, and the cancel button 102 is operated when the distribution operation stopped.

The URL setting area 96, as described above, is an area for inputting (setting) the URL, from which the image data that is distributed (transmitted) is downloaded, but in the embodiment, it is possible that several URLs that are set in advance as a pull-down menu are selectively set. However, it is also possible that only one URL is fixedly set.

At this point, the URL functions as a place information indicating a place where the image data is retained, is in a data format for describing a position of an information resource (data, a service, or the like) that is present on the Internet, and includes a resource acquisition method (type), a position of a computer present on the resource on a network, a position of a resource within the computer, and the like. "http:" in the front of the ULR is a scheme name and represents a name of a protocol that is used for communication. There are many formats for describing identification information subsequent to the scheme name, each of which is configured with a domain name or an IP address, a port number, a folder name, a file name, and the like.

A user ID area 104 for registering a user ID is provided below the URL setting area 96, and an identification (ID) of the user (a distribution user) who distributes the image data in an image data distribution system 10 is registered in the user ID area 104. The user ID may be set in such a manner that the user ID can be input in a pull-down menu format. Basically, a letter, a number, and the like are input individually by a key operation by the user as the user ID.

It is noted that, in a case where a letter, a number, and the like are input individually in the URL setting area 96 or the user ID area 104, although not illustrated, software keys may be displayed.

The destination (the notification destination) to which the image data is distributed (transmitted) is registered in the notification destination setting area 98. An address book button 106 and an OK button 108 are arranged in a manner that is attached to the notification destination setting area 98.

The address book button 106 is a button for invoking an address book (not illustrated) is referred to when inputting a notification destination address into the notification destination setting area 98. When the notification destination address is set to be in the notification destination setting area 98, the address book button 106 is touched to open an address book, and the touching-on of a desired address causes the address to be input into the notification destination setting area 98.

The OK button 108 is operated when the registration of the notification destination address in the notification destination setting area 98 is completed.

A control information button 110 is set to be positioned to the left of the start button 94. When the control information button 110 is operated, because a UI (not illustrated) for setting the above-described control information is displayed, the user can set resolution and the like in the same manner as he/she does when a usual scanning operation is used.

When the start button 94 is operated by a user who makes a distribution, the image reading operation is performed in the image reading apparatus 22 (the scanning unit 36) of the image formation apparatus 12, and the image data that is output from the scanning unit 36 is uploaded onto the URL that is described in the URL setting area 96. Furthermore, the image formation apparatus 12, for example, transmits the notification mail 100 for the image data that is uploaded onto the URL as illustrated in FIG. 7, to the notification destination address that corresponds to the notification destination address that is described in the notification destination setting area 98.

The notification mail 100 of which an example is illustrated in FIG. 7 is a mail for notifying the notification destination (the destination) which has to receive the image data which is distributed that the data image is uploaded onto the ULR. The notification mail 100 includes a notification message 112. The notification message 112 notifies that the image data which has to be received by the notification destination is present in the URL that is displayed in a URL display box 114. Examples of the notification include the notification "Data is retained in the form of a file. Please refer to the following URL." The URL that is set, by the user who is a transmission source, to be in the URL setting area 96 (FIG. 6) is described in the URL display box 114.

A deletion button 116 is further set to be in the notification mail 100. The deletion button 116 is a button that is operated when the image data that is uploaded onto the above-described URL is deleted. Basically, the image data can be deleted by operating the deletion button 116 after the user who is a notification destination that is a recipient of the image data downloads the image data. More precisely, the deletion button 116 provides a function (a function of urging the user to perform deletion) in which the image data that is retained in the above-described URL can be deleted. Then, by using the deletion function, a deletable message 118 alerts the user who is the notification destination that the image data can be deleted. Furthermore, the deletable message 118 also has a function of urging the user to delete the image data that is uploaded onto the URL.

When the deletion button 116 is operated, the image data that is uploaded onto the URL is deleted. Furthermore, the deletion notification mail 120 for the deleted image data is transmitted to the user terminal 14 of the user who operates the deletion button 116.

Then, the deletion notification mail 120 in FIG. 8 is a notification mail for alerting that the image data is deleted by a person (a user who performs deletion) that is designated as a distribution destination (a transmission destination) of the image data. Therefore, the person who receives the deletion notification mail 120 knows that the image data is deleted. In the deletion notification mail 120, an address of the URL area 90 (FIG. 5) in which the image data is stored, more precisely, the URL that is a link destination onto which the image data is uploaded is displayed in a URL display box 124. A notification sentence 126 says that the image data which is retained in the URL which is displayed in the URL display box 124 is deleted. The notification sentence 126 includes detailed data 126a indicating a date on which a deletion is made and from whom (which user terminal) a deletion instruction, according to which the deletion is made comes. More precisely, the notification sentence 126 is the notification sentence saying when and by whom the image data is deleted.

Figure 9:
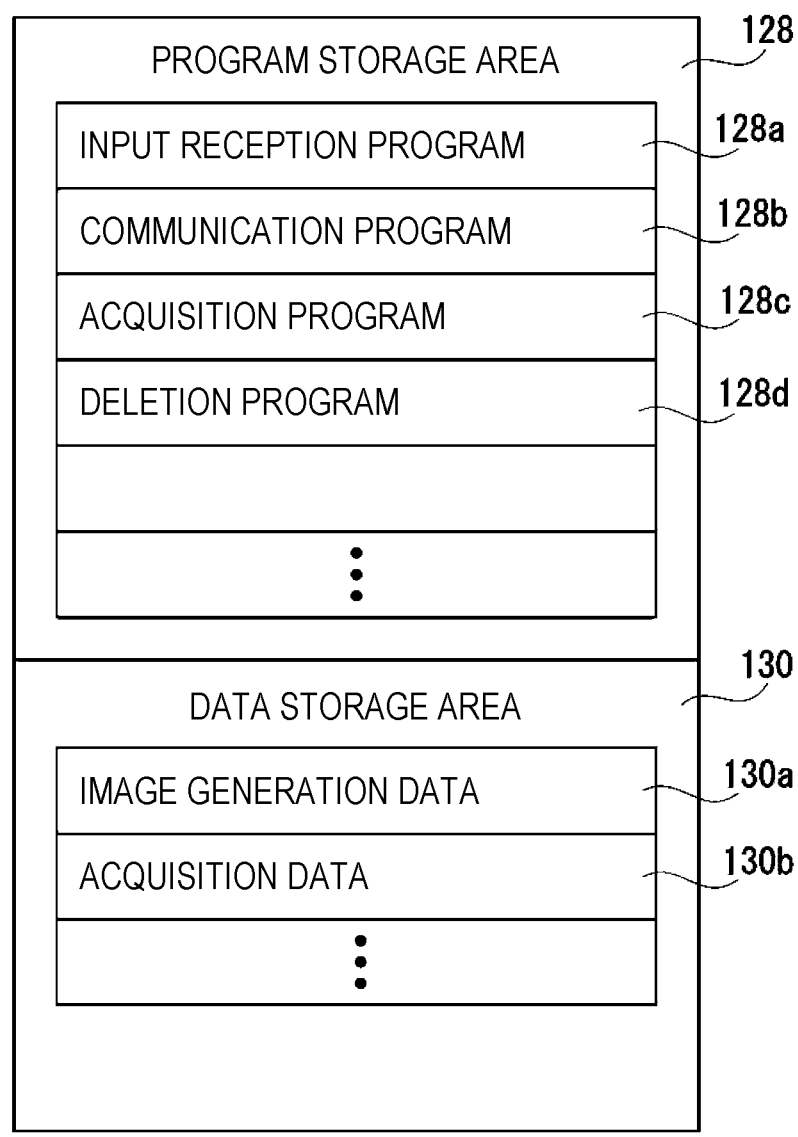
FIG. 9 is a diagram illustrating an example of a memory map of a memory of the user terminal.

For example, a program storage area 128 and a data storage area 138, as illustrated in FIG. 9, are provided in the memory 76 of the user terminal 14.

The program storage area 128 includes an input reception program 128a, a communication program 128b, an acquisition program 128c, a deletion program 128d, and the like.

The input reception program 128a, for example, is a program for receiving touch (operation) input by the user on the touch display 80 (FIG. 4).

The communication program 128b is a program for communicating with the image formation apparatus 12 via the network 16 using the communication module 78 (FIG. 4).

The acquisition program 128c is a program for acquiring the image data from the URL that is indicated by the notification mail 100, that is, an acquisition resource.

The deletion program 128d is a program for deleting the image data that is set to be in the URL area 90 of the above-described memory 62 when operating the deletion button 116 that is displayed in the notification mail 100.

An image generation data area 130a for storing image generation data desirable for displaying an image on a touch display 80 is set to be in a data storage area 130 of the memory 76. The image data that is acquired from an acquisition link, that is, the URL according to the above-described acquisition program 128c is stored in an acquisition data area 130b.

Operation of the image data distribution system 10 that is configured in this manner will be described, for example, with reference to flowcharts in FIGS. 10 and 11.

The CPU 60 of the image formation apparatus 12, receives the operation input from the touch display 34, or input that is received in the communication module 70, according to the input reception program 86a that is illustrated in FIG. 5. As a result, the user operates the deletion button 116 in FIG. 7 in the touch display 80 of the user terminal 14, and thus, the CPU 60 determines in Step S1 in a flowchart in FIG. 10 whether or not the deletion instruction is input from the user terminal 14.

In a case where the deletion instruction is not present, a result of the determination in Step S3 is "NO," and in Step S1, the CPU 60 further determines whether or not an instruction to distribute the image data is input from the touch display 34.

It is noted that the instruction to distribute the image data can be input by operating an "image distribution" button that is displayed on a menu screen (not illustrated). Therefore, in Step S3, the CPU 60 determines whether or not a distribution instruction button within the menu screen on the touch display 34 is operated.

When a result of the determination in Step S3 is "YES," more precisely, when an instruction for the distribution of the image data is provided, in next Step S5, the CPU 60 displays the distribution setting GUI 92 that is illustrated in FIG. 6 on the touch display 34, using data that is stored in the display image data area 88a that is illustrated in FIG. 5.

A user of the image formation apparatus 12 sets the distribution destination and the like using the distribution setting GUI 92. More precisely, an original document, an image on which is desired to be read, is loaded onto the original-document loading tray 28 (FIG. 2). Subsequently, by operating the control information button 110, the user sets pieces of control information, such as resolution, separately from the color or monochrome type that is set when an original document is read in the scanning unit 36, and the pieces of information are received and are registered in Step S7. However, in Step S7, the pieces of control information, such as a resolution of 400 dpi, may be set by default.

Subsequently, with reference to the address book, the user sets a distribution destination address to be in the notification destination setting area 98, if desirable. The distribution destination address is received and is registered in Step S9. However, the URL for the URL area 90 (FIG. 5) may be set by default to be in the URL setting area 96.

In subsequent Step S11, the CPU 60 determines whether or not setting for URL transmission is enabled. In Step S11, the CPU 60 determines whether or not the start button 94 of the distribution setting GUI 92 is operated. When the start button 94 is operated, a result of the determination in Step S11 is "YES," and in subsequent Step S13, the CPU 60 sends a command to the scanning unit 36, and causes an original document to be read according to the control information that is set.

In next Step S15, the image data that is read in the scanning unit 36 is retained in the URL area 90 (FIG. 5). Therefore, Step S15 that is performed by the CPU 60 functions as a retention unit that retains the image data in a retention place (the URL area 90). When it is determined in Step S17 that processing in Step S15 is completed, in Step S19, the CPU 60 transmits, for example, the notification mail 100 that is illustrated in FIG. 7, to the notification destination that is set in Step S9, according to the notification program 86d or the like. Therefore, the CPU 60 that performs Step S19 constitutes a transmission unit.

It is noted that, in a case where the result of the determination in Step S11 is "NO," the CPU 60 transmits a normal mail in Step S21. The normal mail is a mail for distributing the image data directly to the notification destination that has to receive the image data which is distributed, and the image data that is distributed is attached to the normal mail. More precisely, in the case where the result of the determination in Step S11 is "NO," the image data is transmitted as a file attached to the normal mail.

Moreover, when the CPU 60 determines in Step S1 that the deletion instruction is input, in subsequent Step S23, the CPU 60 deletes the image data that is designated with the deletion instruction, from the URL area 90. More precisely, when the deletion function that is set in advance to be in the notification mail 100 in FIG. 7 is used, that is, when the deletion button 116 is pressed down, the deletion instruction is input into the CPU 60 of the image formation apparatus 12. Because the URL display box 114 is set to be in the notification mail 100, the CPU 60 can easily know which image data has to be deleted in Step S23, with reference to contents (an IP address, a port number, a folder name, a file name, and the like) of the URL.

The image data is deleted in Step S23, and then, in next Step S25, the CPU 60 transmits the deletion notification mail 120 that is illustrated in FIG. 8, to the user terminal that transmits the deletion instruction. As in the first embodiment, in a case where the image data is distributed to only one destination, the user terminal here is just the user terminal that transmits the notification mail 100 in Step S19.

It is noted that the CPU 60 functions as a deletion unit that performs Step S23, and the CPU 60 that performs Step S25 functions as a deletion notification unit.

In this manner, the image formation apparatus 12 uploads the image data, which is read in the scanning unit 36, onto the URL area 90, and notifies the user terminal 14, which is a target in the notification mail 100, of the image data that is read.

Figure 11:
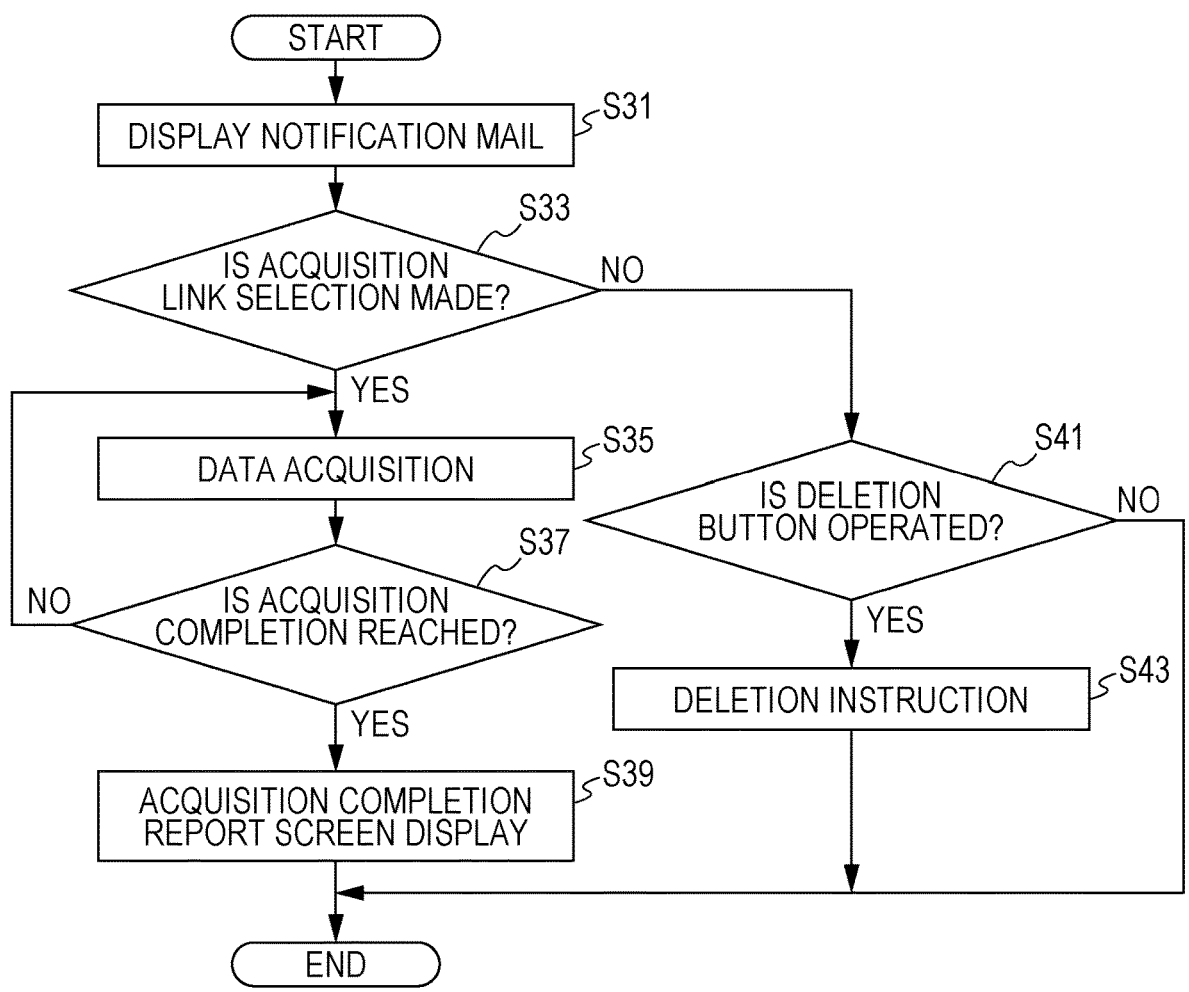
FIG. 11 is a flowchart illustrating operation of the user terminal.

In the first Step S31 in the flowchart in FIG. 11, the user terminal 14 that receives the notification mail 100 displays the notification mail 100, which is received by the CPU 72 (FIG. 4), on the touch display 80 (FIG. 4). A user of the user terminal 14 take a look at the notification mail and knows that the image data is sent with his/her user terminal being designated. Then, when the image data is desired to be downloaded onto his/her user terminal 14, the user of the user terminal 14 touches on the URL display box 114 of the notification mail 100, and thus selects the acquisition link (the URL area 90) that is displayed there. This touch input is detected by the input reception program 128a.

When in Step S33, the acquisition link (the URL area 90) is selected in the user terminal 14, in Step S35, the CPU 72 controls the communication module 78 according to the communication program 128b (FIG. 9) and accesses the URL area 90. The CPU 72 acquires the image data that is stored there, according to the acquisition program 128c (FIG. 9) and stores the acquired image data in the acquisition data area 130b (FIG. 9).

When it is determined in Step S37 that the acquisition of the image data is completed, in next Step S39, the CPU 72 displays an acquisition completion report screen (not illustrated), which includes, for example, a sentence saying "importing of the image data is completed," or a figure representing the completion, on the touch display 80.

However, when the acquisition link is not selected in Step S33, more precisely, when the URL display box 114 is not selected, subsequently in Step S41, the CPU 72 determines whether or not the deletion button 116 of the notification mail 100 is touched on (operated). This user operation can be detected by the input reception program 128a.

When it is detected that the deletion button 116 is operated, in next Step S43, the CPU 72 transmits to the above-described deletion instruction to the image formation apparatus 12 according to the communication program 128b. The deletion instruction is transmitted to the image formation apparatus 12, and as described above, the file of the image data is deleted in the image formation apparatus 12.

According to the embodiment, when the deletion instruction is transmitted from the user terminal 14 by selecting the deletion button 116 of the notification mail 100, because the image data is deleted in the deletion unit, the user can be kept from forgetting the deletion, and eventually a disadvantage can be avoided in which the image data whose owner is unknown remains within the memory. Because the image data whose owner is unknown does not remain, there is an advantage that a memory capacity can be effectively used.

In a case where only one distribution destination of the image data is present, the above-described notification mail 100 in FIG. 7 is a notification mail that is transmitted only to one address.

Second Embodiment

Figure 12:
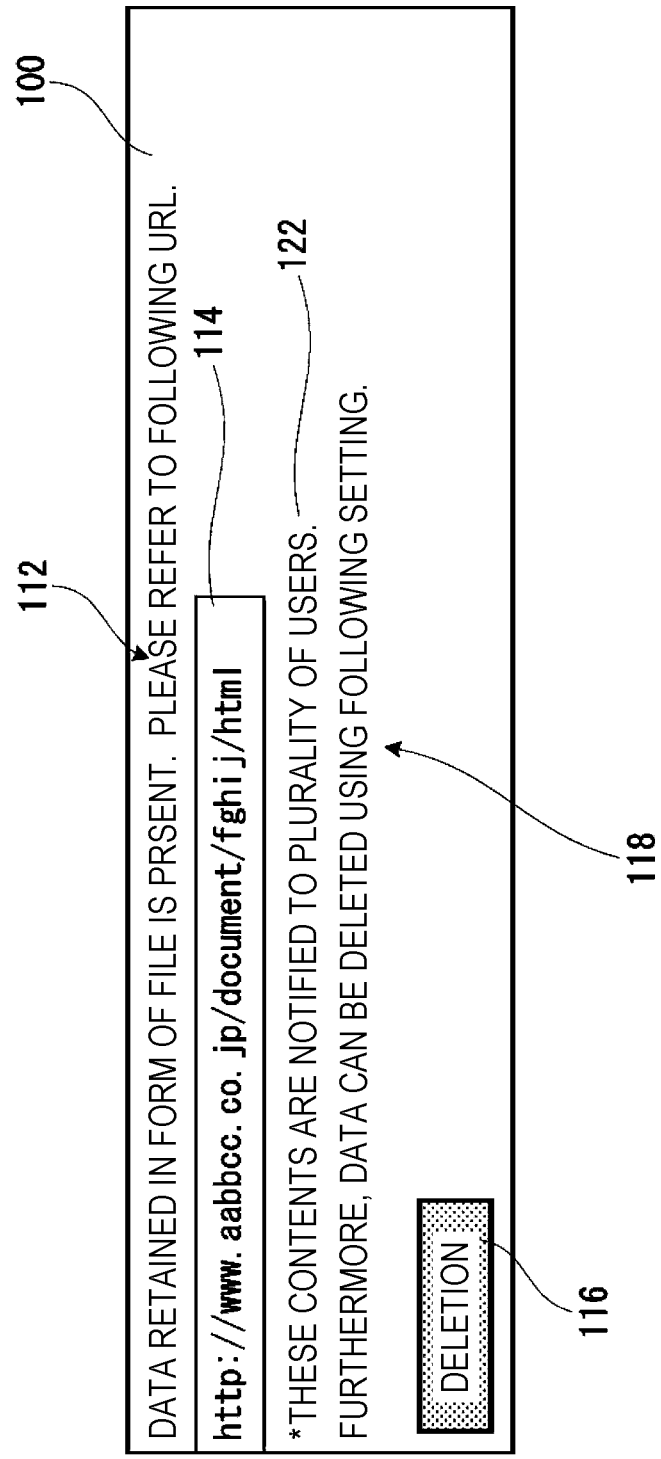
FIG. 12 is a diagram illustrating an example of a notification mail that is available when image data is distributed to a plurality of distribution destinations, which is transmitted from the image formation apparatus to the user terminal.
Figure 13:
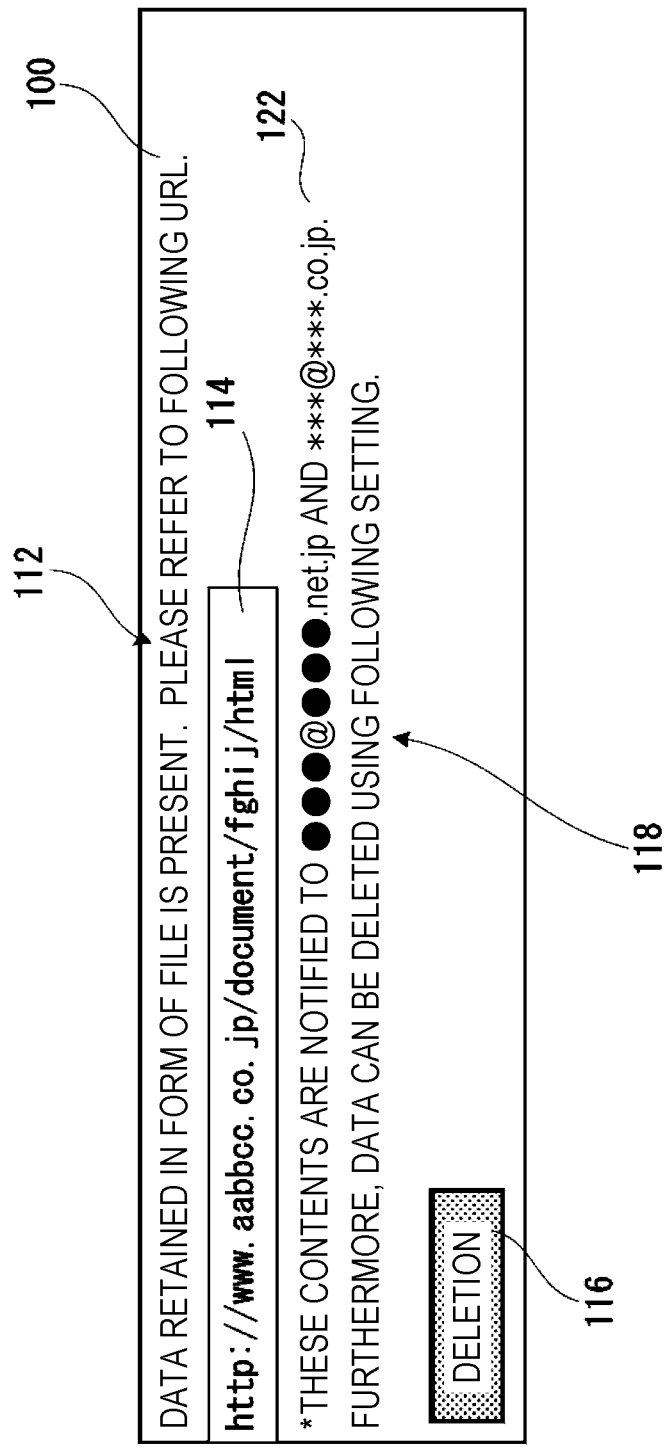
FIG. 13 is a diagram illustrating another example of the notification mail that is available when the image data is distributed to the plurality of distribution destinations, which is transmitted from the image formation apparatus to the user terminal.

In contrast, the notification mail that is illustrated in FIG. 12 or 13 is a notification mail that is transmitted to two or more addresses in a case where two distribution destinations of the image data are present.

In the notification mail 100 that is illustrated in FIG. 12, with an attention sentence 122, it is known that there are persons to which the image data is to be distributed in addition to the person who receives the notification mail 100. Specifically, in the notification mail 100, with the attention sentence 122, it is known that the notification mail 100 is to be transmitted to at least one notification destination that is at least one user terminal, in addition to the user terminal that is used by the person who receives the notification mail 100. More precisely, with the attention sentence 122, it is known that there are other notification destinations.

In the same manner, the notification mail 100, which is illustrated in FIG. 13, also includes the attention sentence 122, but an embodiment in FIG. 13 is different from the embodiment in FIG. 8 in that other notification destinations are known through their respective addresses.

In this embodiment, the distribution-completed image data can also be deleted by operating the deletion button 116 of the notification mail 100, but in the notification mail 100 in FIG. 12 or 13 at the time of the distribution to a plurality of distribution destinations (notification destinations), with the attention sentence 122, it is known that other distribution destinations are present. Thus, the user is urged to pay attention to the deletion.

Figure 10:
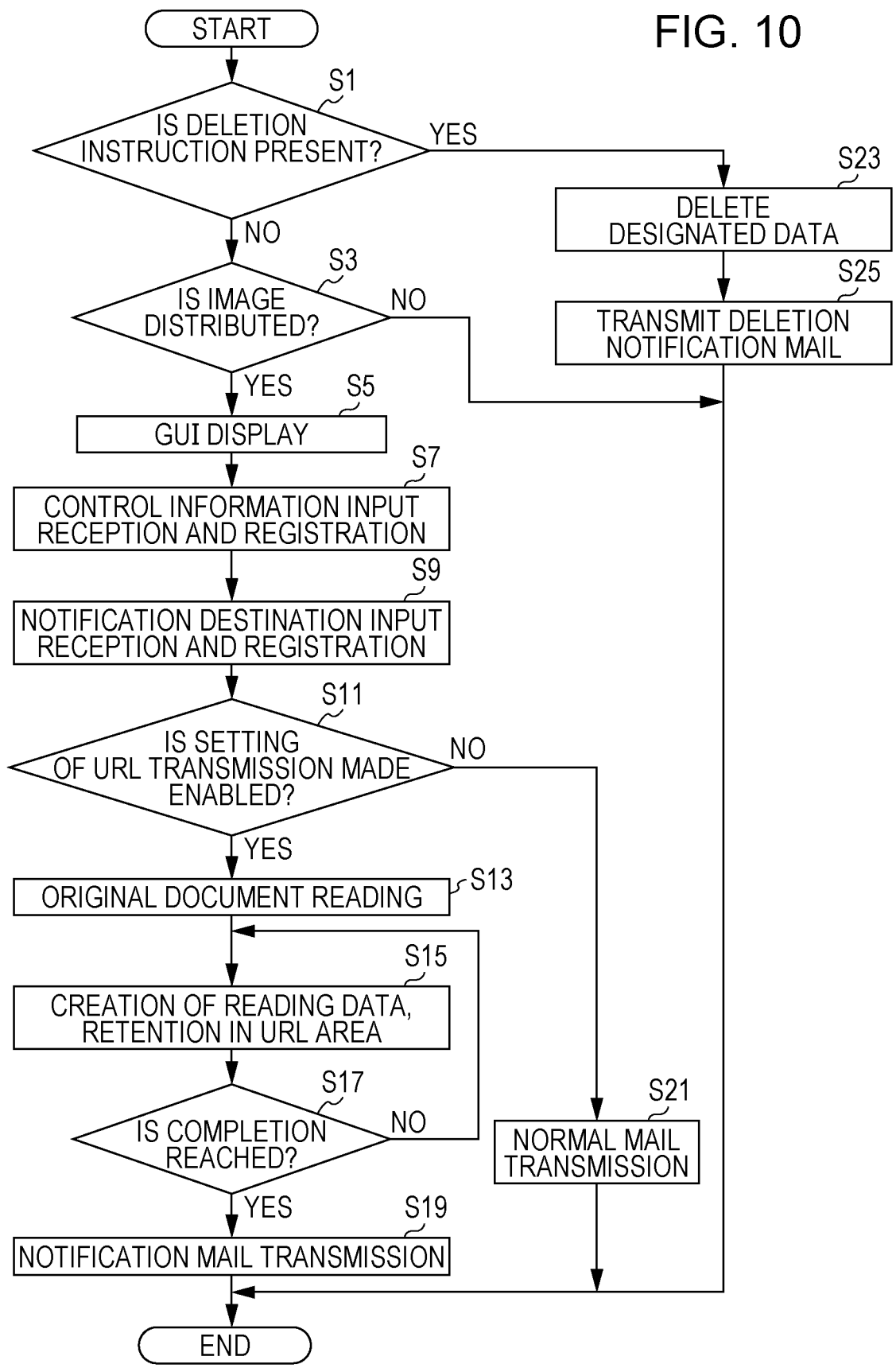
FIG. 10 is a flowchart illustrating operation of the image formation apparatus.

In a second embodiment, the CPU 60 of the image formation apparatus 12 operates according to the flowchart that is illustrated in FIG. 10. However, in this embodiment, in Step S9, a plurality of notification destinations are provided in the notification destination setting area 98 of the distribution setting GUI 92 that is illustrated in FIG. 6. For this reason, in Step S19, the notification mail 100 that is illustrated in FIG. 12 or 13 is transmitted to all notification destinations that perform the reception in Step S9.

Then, when the CPU 60 determines in Step S1 that the deletion instruction is input, in subsequent Step S23, the CPU 60 deletes the image data that is designated with the deletion instruction, from the URL area 90. More precisely, when the deletion function that is set in advance to be in the notification mail 100 in FIG. 7 is operated, that is, when the deletion button 116 is pressed down, the deletion instruction is input into the CPU 60 of the image formation apparatus 12.

Then, the image data is deleted in Step S23, and then, in next Step S25, the CPU 60 transmits the deletion notification mail 120 that is illustrated in FIG. 8. Accordingly, in a case where the image data is distributed to a plurality of user terminals 14, the information that the image data is deleted can be shared among the user terminals 14.

In this case, with reference to pieces of information (an IP address, a port number, a folder name, a file name, and the like) in the URL display box 114 of the notification mail 100, from which user terminal, that is, from which notification destination the deletion instruction is transmitted can be easily known. Because of this, the user (the user terminal) that transmits the deletion instruction is displayed on the detained data 126a that is displayed in FIG. 8. More precisely, with the deletion notification mail 120 that is illustrated in FIG. 8, from whom the deletion instruction, according to which the image data in the URL area 90 (FIG. 5) is deleted, comes is known. For this reason, the user who is the destination (the notification destination) that is deleted while target image data is not downloaded contacts the notification destination (the user) that is illustrated in the detained data 126a of the deletion notification mail 120, and thus can receive the image data, opportunity for whose download is missed, from the user.

However, in the case of the embodiment in FIG. 13, in which an address of any other notification destination is described in the attention sentence 122 of the notification mail 100, the user who is the destination (the notification destination) that is deleted while the target image data is not downloaded directly contacts an address of the attention sentence 122, and thus can receive the image data, an opportunity for whose download is missed, from the user.

It is noted that the deletion notification mail 120 may be transmitted to all distribution destinations, but that the user who transmits the deletion instruction may be removed from a group of distribution destinations of the deletion notification mail 120. This is because the user who transmits the deletion instruction knows that the image data is deleted, even without receiving the notification.

Third Embodiment

Figure 14:
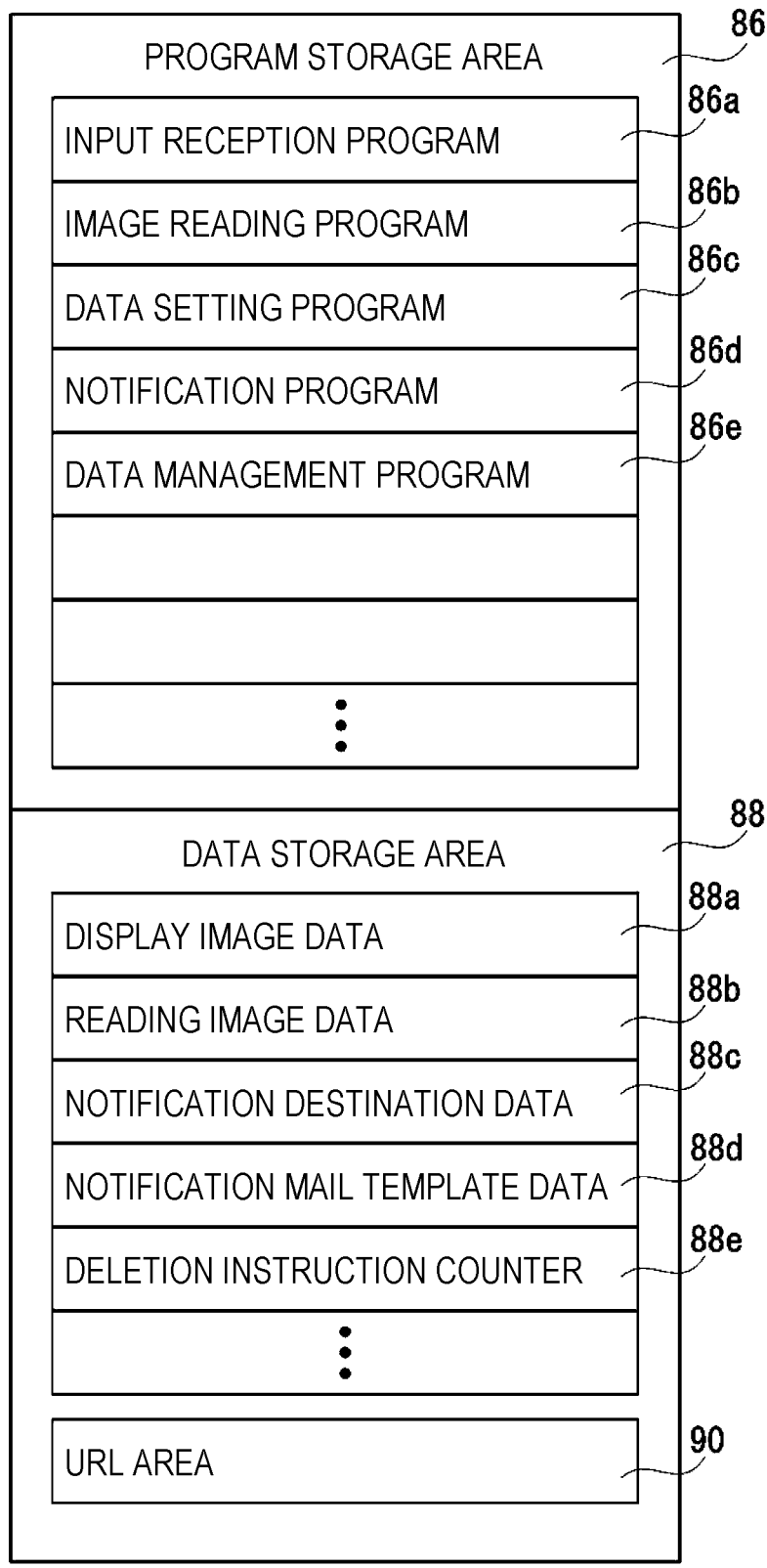
FIG. 14 is a diagram illustrating an example of a memory map of a memory of an image formation apparatus in an image data distribution system according to another embodiment of the present disclosure.

In the same manner as in the second embodiment, in a third embodiment, the image data is distributed to a plurality of notification destinations. However, in the third embodiment, as illustrated in FIG. 14, a deletion instruction counter 88e is set to be in the data storage area 88 of the memory 62. The deletion instruction counter 88e is a counter for counting how many users, that is, how many user terminals 14 transmit the deletion instruction, and is controlled by the data management program 86e that is illustrated in FIG. 5.

Figure 15:
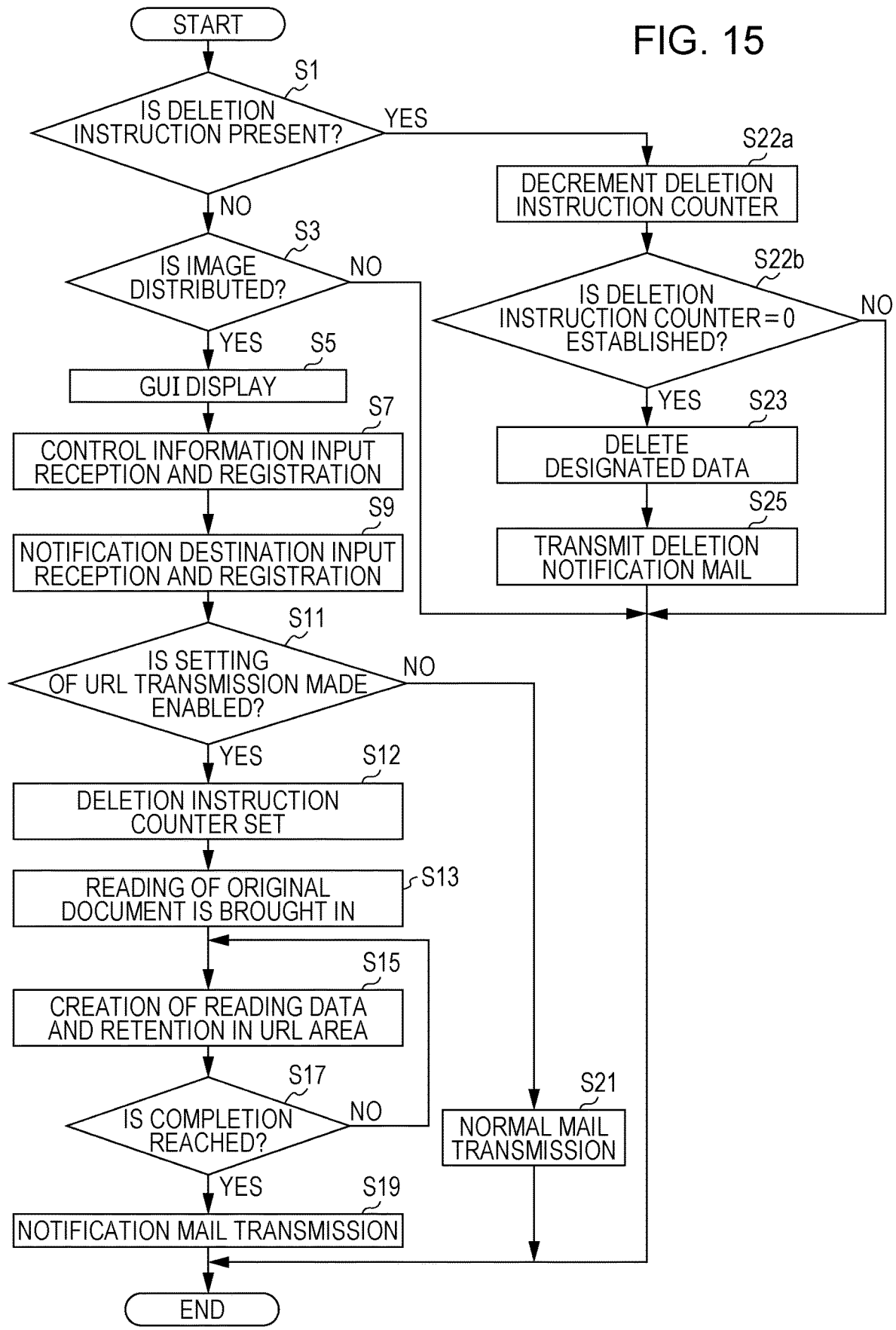
FIG. 15 is a flowchart illustrating operation of the image formation apparatus according to the embodiment.

Then, in the third embodiment, the CPU 60 of the image formation apparatus 12 operates according to the flowchart that is illustrated in FIG. 15. However, an operation that is the same or similar as those in the above-described embodiments is given a reference numeral that is the same as that in FIG. 10 and a description thereof is omitted to avoid redundancy.

When the result of the determination is "YES" in Step S11, the CPU 60 sets an initial value for the deletion instruction counter 88e. The initial value in this case is the number of notification destinations that perform the reception in Step S9. If the image data is distributed to two destinations, the initial value is "2." If the image data is distributed to i destinations, the initial value is "i."

Therefore, in Step S19, the notification mail 100 that is illustrated in FIG. 12 or 13 is transmitted to all notification destinations that perform the reception in Step S9.

Then, when a result of determination in Step S1 is "YES," that is, when the deletion instruction is detected, proceeding to Step S22a takes place, and the CPU 60 decrements the deletion instruction counter 88e (by 1) according to the data management program 86e.

Then, in next Step S22b, the CPU 60 determines whether or not the deletion instruction counter 88e reaches "0," more precisely, whether or not the deletion instruction is transmitted from all notification destinations to which the distribution is made in Step S19. Step S22b is performed as a detection unit, which detects that the deletion instructions from all the plurality of user terminals that transmit the notification mail 100 are present, functions. When a result of determination is "NO," the processing is ended. When the result of the determination is "YES," in the same manner as in Step S23 and S25 in the above-described embodiment, the image data is deleted from the URL area 90, and the deletion notification mail 120 (FIG. 8) is transmitted to the distribution destination. However, in the embodiment, because a plurality of user terminals are designated as the distribution destinations, the deletion notification mail 120 is also transmitted to a plurality of user terminals 14.

In this case, with reference to pieces of information (an IP address, a port number, a folder name, a file name, and the like) in the URL display box 114 of the notification mail 100, from which user terminal, that is, from which notification destination the deletion instruction is transmitted can be easily known. Because of this, the deletion notification mail 120 may be transmitted to a notification destination (a distribution destination) other than the user (the notification destination) that transmits the deletion instruction. This because the user who transmits the deletion instruction knows that the image data is deleted, even without receiving the notification.

In the third embodiment, the upload of the image data that is read is notified to a plurality of notification destinations, and each notification destination downloads the image data. Thereafter, although the deletion instruction is set to be transmitted to the image formation apparatus 12 by operating the deletion button 116 (FIG. 7), the image data is not deleted until all deletion instructions from all notification destinations arrive. Because of this, a disadvantage can be avoided in which the download is difficult to perform in any notification destination.

Fourth Embodiment

In the second embodiment in which a plurality of distribution destinations are designated, it is checked that the image data is downloaded onto all distribution destinations, and then the image data is set to be deleted from the URL area 90. In order to do this, the deletion instruction counter 88e (FIG. 14) is used.

In contrast, in a fourth embodiment, in a case where a plurality of distribution destinations are designated, it is checked that the image data is downloaded onto all distribution destinations, and then the image data is set to be deleted from the URL area 90. In order to do this, a notification destination table 132 that is illustrated in FIG. 16 is created in the data storage area 88 (FIG. 5) of the memory 62 of the image formation apparatus 12. The notification destination table 132 is also further managed (controlled) by the data management program 86e.

The notification destination table 132, as illustrated in FIG. 16, has a notification destination field 132a in which the address of the notification destination is stored and a deletion instruction field 132b showing whether or not the deletion instruction from each notification destination is present. When the deletion instruction is input from the notification destination according to the operation of the deletion button 116, the CPU 60 puts a white circle ("1") in the deletion instruction field 132b for the notification destination according to the data management program 86e.

Figure 17:
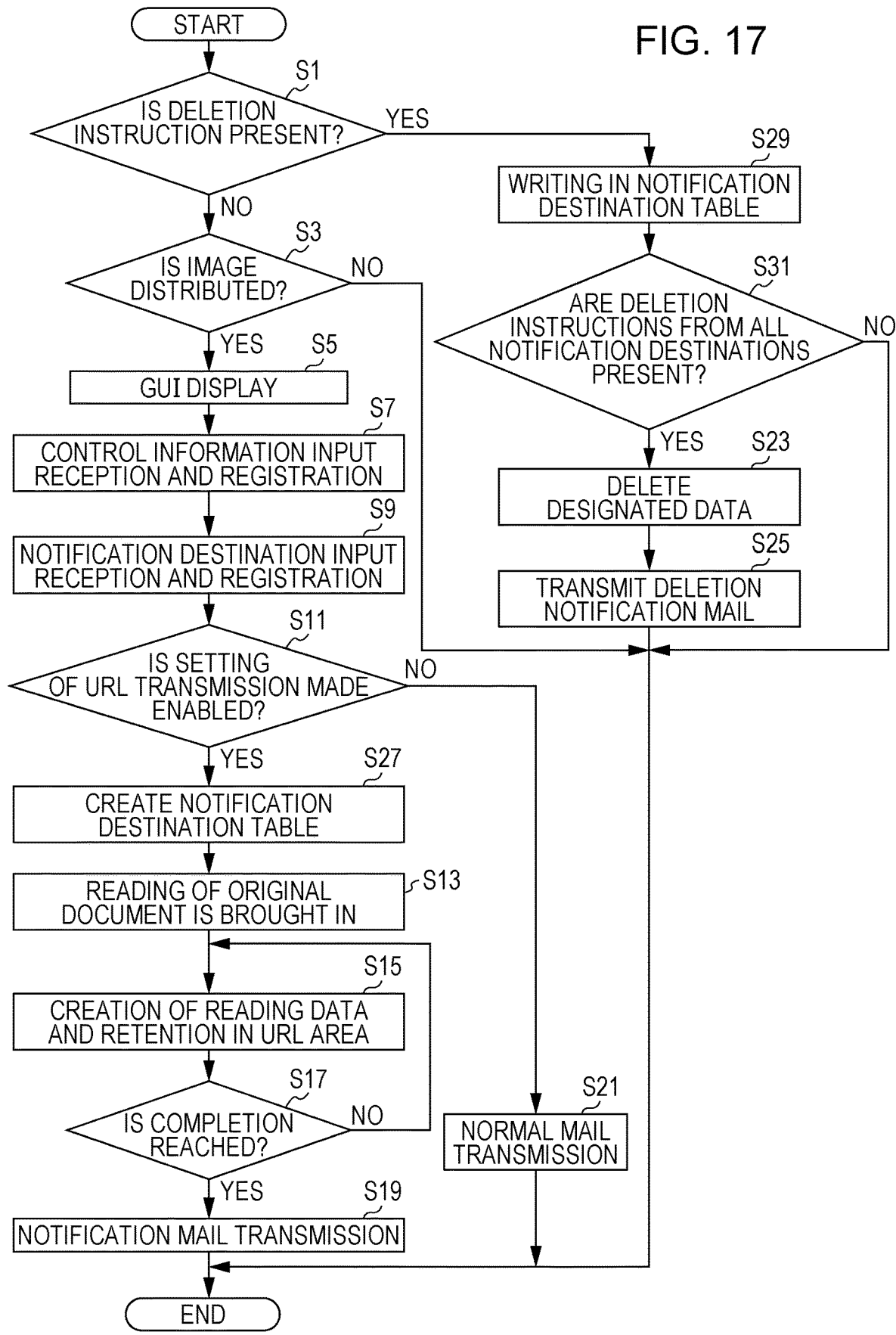
FIG. 17 is a flowchart illustrating an example of operation of the image formation apparatus according to the embodiment.

Then, in the embodiment, the CPU 60 of the image formation apparatus 12 operates according to the flowchart that is illustrated in FIG. 17. However, an operation that is the same or similar as those in the above-described embodiments is given a reference numeral that is the same as that in FIG. 10, and a description thereof is omitted to avoid redundancy.

When the result of the determination in Step S11 is "YES," in Step S27, the CPU 60 creates the notification destination table 132 by writing all notification destinations in the notification destination field 132a of the notification destination table 132 (FIG. 7). However, at this time, the deletion instruction field 132b remains still unoccupied.

Therefore, in Step S19, the notification mail 100 that is illustrated in FIG. 12 or 13 is transmitted to all notification destinations that perform the reception in Step S9.

Then, when the result of determination in Step S1 is "YES," that is, when it is detected that the deletion instruction is received, proceeding to Step S28 takes place, and the CPU 60 writes "1" in the deletion instruction field 132b for the notification destination in the notification destination table 132 according to the data management program 86e. At this time, with reference to pieces of information (an IP address, a port number, a folder name, a file name, and the like) in the URL display box 114 of the notification mail 100, the CPU 60 can easily know from which user terminal, that is, from which notification destination the deletion instruction is transmitted.

Then, in next Step S29, the CPU 60 determines whether or not "1" is written in the deletion instruction fields 132b for all notification destinations in the notification destination table 132. Subsequently, in Step S31, it is determined whether or not the deletion instruction counter 88e reaches "0," more precisely, whether or not the deletion instruction is transmitted from all notification destinations to which the distribution is made in Step S19. Step S31 is performed as the detection unit, which detects that the deletion instructions from all the plurality of user terminals that transmit the notification mail 100 are present, functions. When the result of the determination is "NO," the processing is ended. When the result of the determination is "YES," in the same manner as in Step S23 and S25 in the above-described embodiment, the image data is deleted from the URL area 90, and the deletion notification mail is transmitted to the distribution destination. However, in the embodiment, because a plurality of user terminals are designated as the distribution destinations, the deletion notification mail is also transmitted to a plurality of user terminals 14.

In the fourth embodiment, the upload of the image data that is read is notified to a plurality of notification destinations, and each notification destination downloads the image data. Thereafter, although the deletion instruction is set to be transmitted to the image formation apparatus 12 by operating the deletion button 116 (FIG. 7), the image data is not deleted until all deletion instructions from all notification destinations arrives. Because of this, a disadvantage can be avoided in which the download is difficult to perform in any notification destination. Thus, the same effect as in the third embodiment can be expected.

Fifth Embodiment

Figure 18:
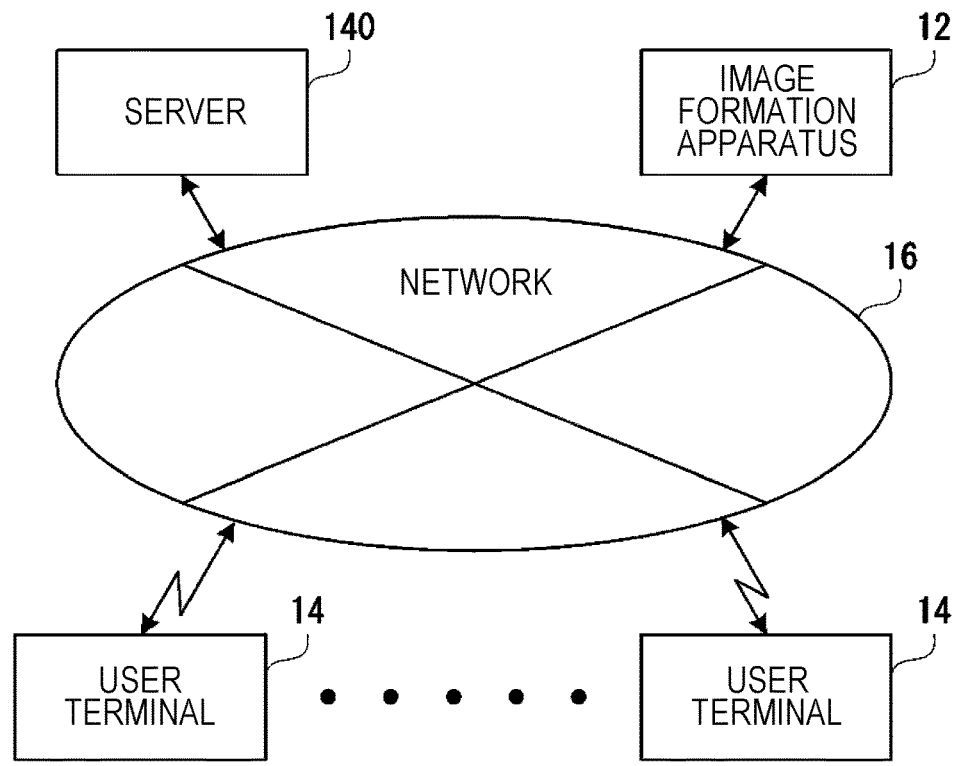
FIG. 18 is a block diagram illustrating an image data distribution system according to still another embodiment of the present disclosure.

In any of the above-described embodiments, the image data distribution system, all portions of which are controlled by the CPU 60 of the image formation apparatus 12, is provided, but in the fifth embodiment, as illustrated in FIG. 18, the image data distribution system 10 uses a server 140 in addition to the image formation apparatus 12 and the user terminal 14, which are illustrated in FIG. 1. For this reason, in the embodiment, generation of the image data, that is, an operation other than the reading of the original document (the image) is controlled by the server 140.

Figure 19:
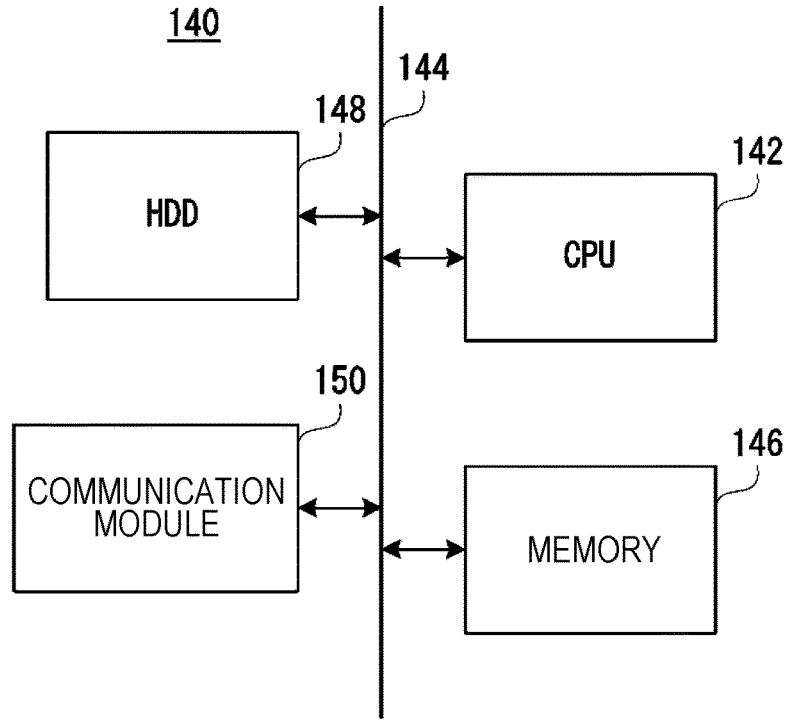
FIG. 19 is a block diagram illustrating an electrical configuration of a server according to the embodiment in FIG. 18.

The server 140, as illustrated in FIG. 19, the server includes a CPU 142. The CPU 142 is connected to a memory 146 via a bus 144. The server 140 further includes a hard disk drive (HDD) 148 for setting a program or the like for operation of the server 140, or retaining desirable data. The server 140 is connected to the network 16 through a communication module 150. Therefore, the server 140 is communicably connected to the image formation apparatus 12 and the user terminal 14 via the network 16. More precisely, the server 140 can be accessed by the image formation apparatus 12 and the user terminal 14 via the network 16.

Figure 20:
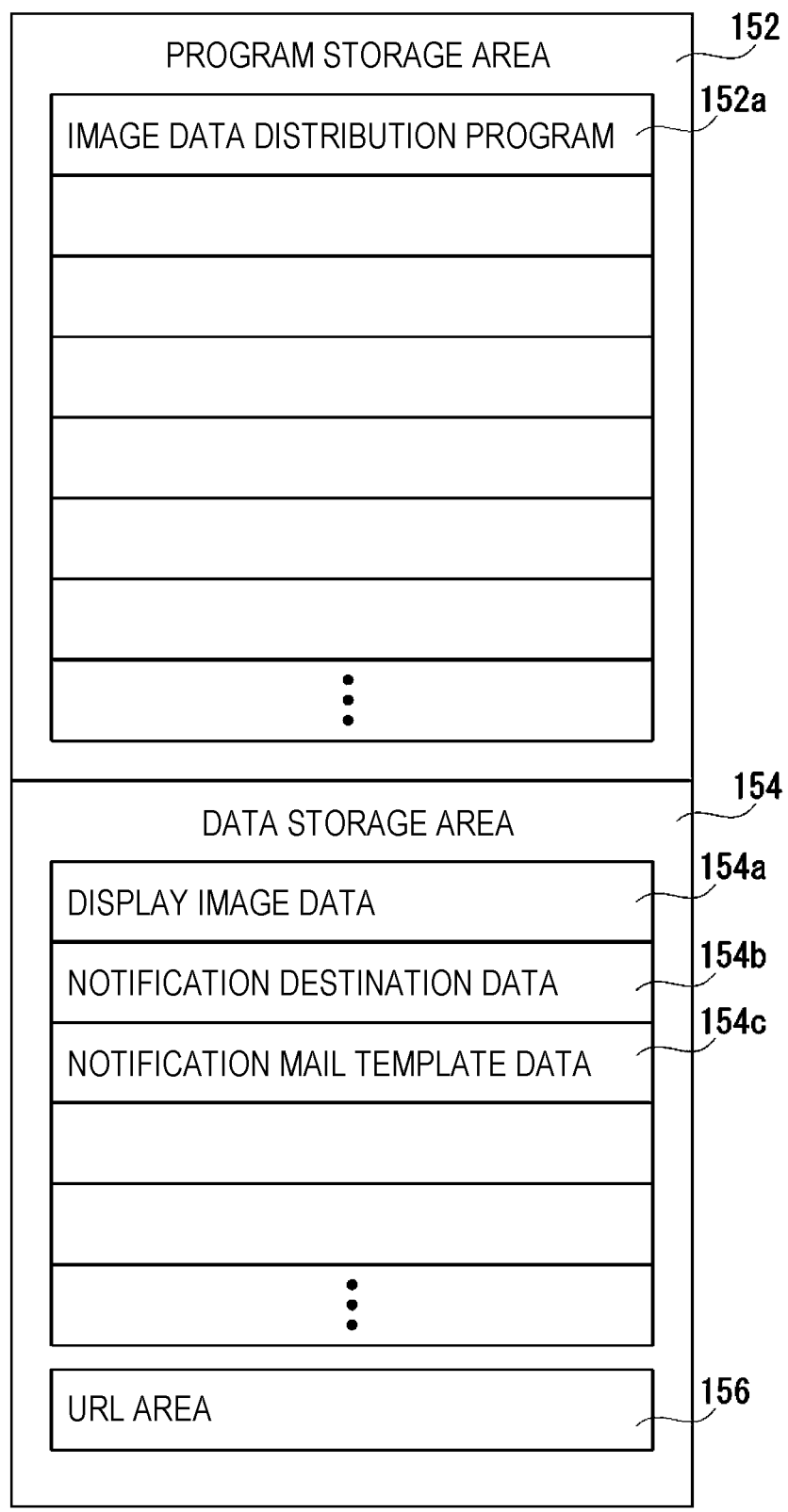
FIG. 20 is a diagram illustrating an example of a memory map of a memory of an image formation apparatus in an image data distribution system according to still another embodiment of the present disclosure.

As illustrated in FIG. 20, a program storage area 152 and a data storage area 154 are provided in the memory 146 of the server 140, and an image data distribution program 152a is provided in the program storage area 152. Programs that are the same as the input reception program 86a, the data setting program 86c, the notification program 86d, the data management program 86e, and the like, which are set to be in the memory 62 (FIG. 5) of the image formation apparatus 12, are included in the image data distribution program 152a. A program that is the same as the image reading program 86b is not included in the image data distribution program 152a. Therefore, the server 140 in the embodiment performs operations can perform the same or similar operations as the CPU 60 of the image formation apparatus 12 according to the first to fourth embodiments, except for reading of the image and can perform control of the entire image data distribution system 10.

Moreover, formed in the data storage area 154 are a display image data 154a, a notification mail template data area 154c, and the like for storing the display image data. The notification destination data area 154b is an area for storing, for example, the data on the notification destination (the destination) that is set to be in the notification destination setting area 98 of the distribution setting GUI 92 in FIG. 6. The notification mail template data area 154c is an area for setting, in advance, the data on the template for the notification mail 100 as illustrated in FIG. 7, the deletion notification mail 120 as is illustrated in FIG. 8, or the like.

For example, a URL area 156 that is indicated with the URL which is set to be in the URL setting area 96 of the distribution setting GUI 92 in FIG. 6 is further provided, as a place for retaining the image data that is read in the image formation apparatus 12, that is, the image reading apparatus 22 (the scanning unit 36), in the data storage area 154.

It is noted that, without being set to be within the memory 146 of the server 140, the URL area 156 may be set to be in any recording medium (a storage area) in such a manner that the image formation apparatus 12 and the user terminal 14 possibly accesses the URL area 156.

In the fifth embodiment in which the server 140 is used, the image data that is read in the image reading apparatus 22 according to the control information that is input into or registered in the distribution setting GUI 92 that is illustrated in FIG. 6 is retained in the URL area 156 of the server 140, or a separate retention place (Step S15 in FIG. 10), and the notification mail 100 that is illustrated in FIG. 7 is transmitted from the server 140 to one user terminal 14 or a plurality of user terminals 14 (Step S19 in FIG. 10).

Then, after the user terminal 14 downloads the image data, when the deletion button 116 is operated (Step S41 in FIG. 11), the server 140 deletes the image data according to the deletion instruction (Step S23 in FIG. 10, Step S23 in FIG. 15, and Step S23 in FIG. 17), and transmits the deletion notification mail 120 to the user terminal 14 (Step S25 in FIG. 10, Step S25 in FIG. 15, and Step S25 in FIG. 17.

According to the fifth embodiment, because complex processing is distributed to the server 140, a load on the image formation apparatus 12 can be reduced.

The present disclosure contains subject matter related to that disclosed in Japanese Priority Patent Application JP 2017-109343 filed in the Japan Patent Office on Jun. 1, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image transmission apparatus that includes an image reading scanner that outputs image data that is read in the image reading scanner to a user terminal via a network, the image transmission apparatus comprising
   a processor; and
   a storage storing a program for causing the processor to perform operations comprising:
   retaining the image data in a retention place in the storage;
   a transmitting a notification mail which has notification contents that includes at least place information indicating the retention place and a deletion function of being able of deleting the image data in the retention place, to the user terminal; and
   deleting the image data in the retention place when a deletion instruction is transmitted from the user terminal using the deletion function.

2. The image transmission apparatus according to claim 1, wherein the notification contents of the notification mail that is to be transmitted to a plurality of user terminals further includes an attention sentence saying that the notification mail is transmitted to at least one notification destination that is at least one user terminal.

3. The image transmission apparatus according to claim 2, wherein the attention sentence includes an address of the notification destination.

4. A non-transitory computer-readable medium having stored therein a program for causing a processor to execute a process of an image transmission apparatus that includes an image reading scanner that outputs image data that is read in the image reading scanner to a user terminal via a network, the program causing the image transmission apparatus to:
   retain the image data in a retention place in a storage;
   a transmit a notification mail which has notification contents that includes at least place information indicating the retention place and a deletion function of being able of deleting the image data in the retention place, to the user terminal; and
   delete the image data in the retention place when a deletion instruction is transmitted from the user terminal using the deletion function.

5. An image data transmission system that includes an image reading scanner that outputs image data that is read in the image reading scanner to a user terminal via a network, the image data transmission system comprising:
   a processor; and
   a storage storing a program for causing the processor to perform operations comprising:
   retaining the image data in a retention place in the storage;
   a transmitting a notification mail which has notification contents that includes at least place information indicating the retention place and a deletion function of being able of deleting the image data in the retention place, to the user terminal; and
   deleting the image data in the retention place when a deletion instruction is transmitted from the user terminal using the deletion function.

* * * * *